(12) United States Patent
Nobukuni

(10) Patent No.: US 9,486,991 B2
(45) Date of Patent: Nov. 8, 2016

(54) MANUFACTURING APPARATUS AND MANUFACTURING METHOD FOR CLEANING WEB MEMBER

(71) Applicant: UNICHARM CORPORATION, Shikokuchuo-shi, Ehime (JP)

(72) Inventor: Hisaoki Nobukuni, Kagawa (JP)

(73) Assignee: UNICHARM CORPORATION, Ehime (JP)

( * ) Notice: Subject to any disclaimer, the term of this patent is extended or adjusted under 35 U.S.C. 154(b) by 184 days.

(21) Appl. No.: 14/371,070

(22) PCT Filed: Dec. 28, 2012

(86) PCT No.: PCT/JP2012/084136
§ 371 (c)(1),
(2) Date: Jul. 8, 2014

(87) PCT Pub. No.: WO2013/105469
PCT Pub. Date: Jul. 18, 2013

(65) Prior Publication Data
US 2015/0018186 A1    Jan. 15, 2015

(30) Foreign Application Priority Data

Jan. 10, 2012    (JP) ................. 2012-002274

(51) Int. Cl.
*B32B 37/00* (2006.01)
*B32B 38/04* (2006.01)
(Continued)

(52) U.S. Cl.
CPC ............... *B32B 38/18* (2013.01); *A47L 13/16* (2013.01); *A47L 13/38* (2013.01); *B26D 5/007* (2013.01);
(Continued)

(58) Field of Classification Search
CPC ............. B32B 37/0046; B32B 37/02; B32B 37/0084; B32B 38/0004; B32B 38/04; B32B 38/105; B32B 38/1808; B32B 2038/045; B32B 41/00; B32B 43/0003; A47L 13/44; A47L 13/24; A47L 13/20; A47L 13/16; Y10T 156/1085; Y10T 156/1304; B29C 65/022; B29C 65/74; B29C 65/7861; B29C 65/7891; B29C 66/95; B29C 2791/002; B29C 2791/009; B29C 2793/0009
See application file for complete search history.

(56) References Cited

U.S. PATENT DOCUMENTS 5,045,135 A    9/1991   Meissner et al.
5,229,181 A    7/1993   Daiber et al.
(Continued)

FOREIGN PATENT DOCUMENTS

JP    2000-343611 A    12/2000
JP    2002-095619 A    4/2002
(Continued)

OTHER PUBLICATIONS

Extended European Search Report dated Oct. 29, 2015, corresponding to European Patent Application No. 12864904.3.
(Continued)

*Primary Examiner* — Linda L Gray
(74) *Attorney, Agent, or Firm* — Hauptman Ham, LLP

(57) ABSTRACT

There is provided a manufacturing apparatus for manufacturing a cleaning web member by intermittently cutting a continuous web member at a product pitch in a transport direction, the continuous web member having a base sheet continuous in the transport direction and a fiber bundle placed on and secured to the base sheet with a direction of fibers being along the transport direction. The manufacturing apparatus includes: an intermittent transport mechanism; a cutter mechanism; a sensor; and a control section. The control section controls a transport amount related to the intermittent transport by the intermittent transport mechanism based on information of the displacement amount output from the sensor.

6 Claims, 12 Drawing Sheets

(51) Int. Cl.
*B32B 41/00* (2006.01)
*A47L 13/16* (2006.01)
*A47L 13/44* (2006.01)
*B29C 65/00* (2006.01)
*B32B 38/18* (2006.01)
*A47L 13/38* (2006.01)
*B32B 43/00* (2006.01)
*B65H 20/00* (2006.01)
*B26D 5/00* (2006.01)
*B26D 5/34* (2006.01)
*B26D 5/32* (2006.01)
*B32B 37/02* (2006.01)
*B29L 31/00* (2006.01)
*B29C 65/08* (2006.01)
*B29C 65/78* (2006.01)

(52) U.S. Cl.
CPC . *B26D 5/32* (2013.01); *B26D 5/34* (2013.01); *B32B 41/00* (2013.01); *B32B 43/003* (2013.01); *B65H 20/00* (2013.01); *B29C 65/08* (2013.01); *B29C 65/7891* (2013.01); *B29C 66/1122* (2013.01); *B29C 66/43* (2013.01); *B29C 66/69* (2013.01); *B29C 66/71* (2013.01); *B29C 66/7294* (2013.01); *B29C 66/73921* (2013.01); *B29C 66/8246* (2013.01); *B29C 66/8322* (2013.01); *B29C 66/8432* (2013.01); *B29C 66/95* (2013.01); *B29C 66/9672* (2013.01); *B29L 2031/7406* (2013.01); *B32B 37/0046* (2013.01); *B32B 37/0084* (2013.01); *B32B 37/02* (2013.01); *Y10T 156/1085* (2015.01); *Y10T 156/1304* (2015.01)

(56) References Cited

U.S. PATENT DOCUMENTS

2002/0148061 A1   10/2002  Tanaka et al.
2013/0340191 A1* 12/2013  Przepasniak ............ A47L 13/16
                                          15/226

FOREIGN PATENT DOCUMENTS

| JP | 2002-346984 A | 12/2002 |
| JP | 2005-040641 A | 2/2005 |
| JP | 2009-153914 A | 7/2009 |
| WO | 2005-084514 A1 | 9/2005 |
| WO | 2009128381 A1 | 10/2009 |

OTHER PUBLICATIONS

International Preliminary Report on Patentability issued Jul. 15, 2014, corresponds to International application No. PCT/JP2012/084136.

International Search Report and Written Opinion mailed Mar. 12, 2013 in International Application No. PCT/JP2012/084136, filed Dec. 28, 2012.

Partial Supplementary European Search Report dated Jul. 7, 2015, corresponding to European patent application No. 12864904.3.

* cited by examiner

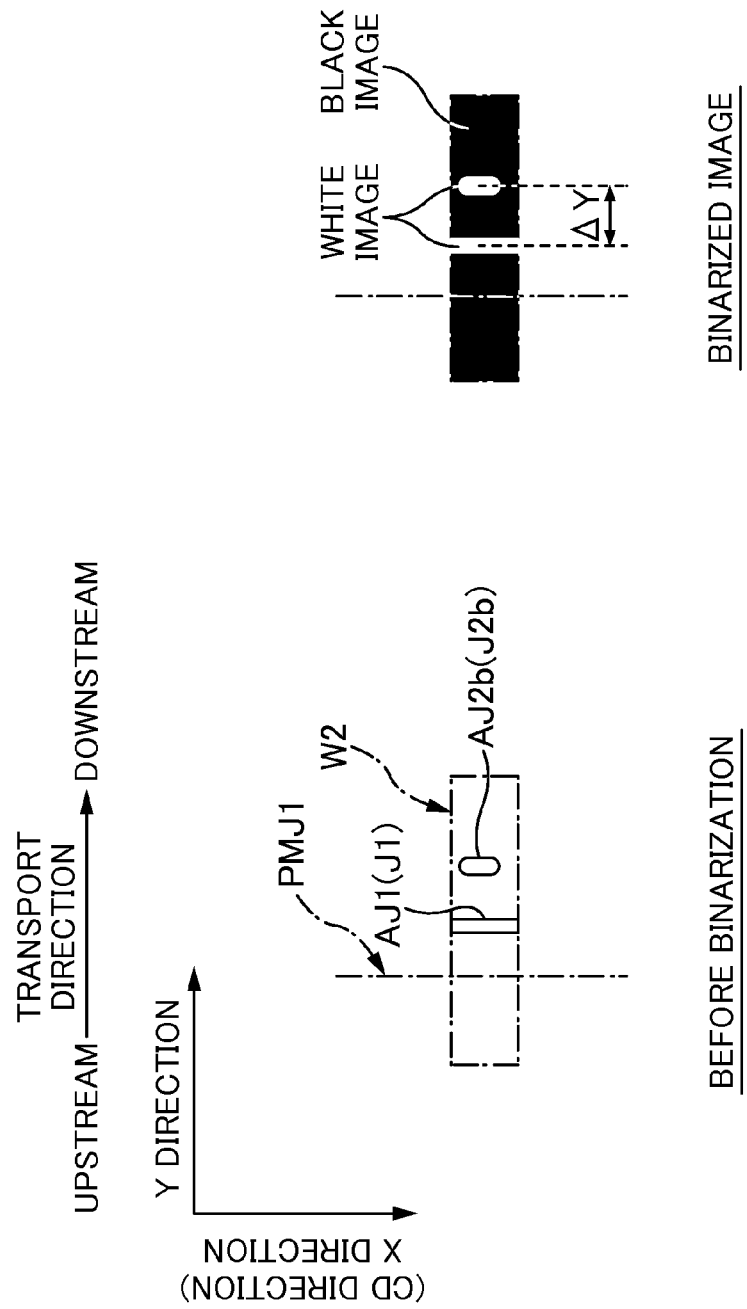

US 9,486,991 B2

MANUFACTURING APPARATUS AND MANUFACTURING METHOD FOR CLEANING WEB MEMBER

RELATED APPLICATIONS

The present application is a national phase of International Application Number PCT/JP2012/084136, filed Dec. 28, 2012, and claims priority from Japanese Application No. 2012-002274 filed Jan. 10, 2012.

TECHNICAL FIELD

The present invention relates to a manufacturing apparatus and manufacturing method for a cleaning web member.

BACKGROUND ART

Conventionally, a cleaning web member into which a handle member is inserted to make the web member usable for cleaning of a tabletop, etc. is known (Patent Document 1)

CITATION LIST

Patent Document

[Patent Document 1] JP 2005-40641A

SUMMARY OF INVENTION

Technical Problem

Such a cleaning web member includes a main body having a base sheet and a fiber bundle placed on the base sheet; and thermoplastic fibers such as tow fibers, for example, are used for the fiber bundle. In the manufacturing line, the base sheet continuous in the transport direction and the fiber bundle secured to the base sheet with the fibers being placed along the transport direction are cut at a product pitch in the transport direction, thereby manufacturing cleaning web members.

Here, the thermoplastic fibers of the fiber bundle are easily fused. Therefore, during the above cutting, there is the possibility that the thermoplastic fibers may be fused and thus bound with each other at cut edges formed by the cutting, making it difficult for the cut edges to function as a brush section. As a method for avoiding this problem, shearing may be used. That is, by performing so-called shearing where thermoplastic fibers of a fiber bundle to be cut are cut by a shearing force applied to the thermoplastic fibers when an upper blade and a lower blade of a cutter mechanism cross each other, like cutting with a pair of scissors, such formation of a bound portion due to fusion at a cut edge can be prevented.

However, to perform the shearing, transport of the continuous web member must be suspended at the position of placement of the cutter mechanism, to perform the cutting during this suspension of transport. In other words, the continuous web member must be transported intermittently in the transport direction in an area from a position immediately upstream from the cutter mechanism to the position of placement of the cutter mechanism.

As an example of a method for controlling the intermittent transport, the following may be used. First, a phototube is placed as a sensor on a transport path for the continuous web member. Passing of marks placed on the continuous web member at the product pitch is detected from a change in the light-receiving state of the phototube that changes when any of such marks is passing. Once the continuous web member has been transported from the detected point by a fixed transport amount, the transport of the continuous web member is suspended. Then, the continuous web member whose transport is suspended is cut, and, after the cutting, the transport is restarted, and hereinafter this process is repeated.

However, there is the possibility that such a phototube may fail to detect the marks that are regions to be detected if the color of the regions is similar to that of their surrounding portions. Also, in the case that both edges of the continuous web member in the width direction have distinctively-shaped portions appearing every cleaning web member, and such distinctively-shaped portions are to be detected as the regions to be detected, if the difference in shape between the distinctively-shaped portions and their surrounding portions is small, the change in the light-receiving state of the phototube when such a distinctively-shaped portion is passing may be small. Therefore, in this case, also, there is the possibility that the phototube may fail to detect the regions to be detected. As a result, a problem arises in the aspects of the accuracy of the transport suspension operation and the precision of the stop position in the intermittent transport.

In view of the conventional problem described above, it is an object of the present invention to improve the accuracy of the transport suspension operation and the precision of the stop position in the intermittent transport of a continuous web member performed when the continuous web member is cut to manufacture cleaning web members.

Solution to Problem

In order to achieve the above-described object, a primary aspect of the invention is directed to A manufacturing apparatus for manufacturing a cleaning web member by intermittently cutting a continuous web member at a product pitch in a transport direction,
the continuous web member having
    a base sheet continuous in the transport direction and
    a fiber bundle placed on and secured to the base sheet with a direction of fibers being along the transport direction, including:
an intermittent transport mechanism that intermittently transports the continuous web member in the transport direction;
a cutter mechanism
    that is disposed downstream from the intermittent transport mechanism in the transport direction, and
    that produce a downstream end portion of the continuous web member as the cleaning web member by cutting and separating the downstream end portion from the continuous web member while transport of the continuous web member is suspended;
a sensor
    that measures a displacement amount of a stop position of a predetermined region of the continuous web member from a target stop position, while transport of the continuous web member is suspended, the measurement being performed at a measurement position which is a position upstream from the intermittent transport mechanism in the transport direction, that includes
an imaging section that, while transport of the continuous web member is suspended,
images one surface of the continuous web member at an imaging position which is the measurement position, and
generates a data of a planar image of the one surface as a planar image data, and
a displacement-amount computation section that computes the displacement amount based on the position of an area in which the predetermined region is imaged and which is within the planar image of the planar image data; and
a control section that controls a transport amount related to the intermittent transport by the intermittent transport mechanism based on information of the displacement amount output from the sensor.

Further, a manufacturing method for manufacturing a cleaning web member by intermittently cutting a continuous web member at a product pitch in a transport direction,
the continuous web member having
a base sheet continuous in the transport direction and
a fiber bundle placed on and secured to the base sheet with a direction of fibers being along the transport direction, including:
transporting intermittently the continuous web member in the transport direction by an intermittent transport mechanism;
producing a downstream end portion of the continuous web member as the cleaning web member by cutting and separating with a cutter mechanism the downstream end portion from the continuous web member while transport of the continuous web member is suspended,
the cutter mechanism being disposed downstream from the intermittent transport mechanism in the transport direction;
measuring a displacement amount of a stop position of a predetermined region of the continuous web member from a target stop position while transport of the continuous web member is suspended,
the measuring being performed at a measurement position which is a position upstream from the intermittent transport mechanism in the transport direction,
the measuring including
generating a data of a planar image of a one surface as a planar image data by imaging at an imaging position the one surface of the continuous web member while transport of the continuous web member is suspended, the imaging position being the measurement position
computing the displacement amount based on the position of an area in which the predetermined region is imaged and which is within the binarized image; and
changing a transport amount related to the intermittent transport by the intermittent transport mechanism based on information of the measured displacement amount.

Features of the invention other than the above will become clear by reading the description of the present specification with reference to the accompanying drawings.

Advantageous Effects of Invention

According to the present invention, it is possible to improve the accuracy of the transport suspension operation and the precision of the stop position in the intermittent transport of a continuous web member performed when the continuous web member is cut to manufacture cleaning web members.

BRIEF DESCRIPTION OF DRAWINGS

FIG. 12A shows a planar image in an inspection window W2 before a binarization processing,
and FIG. 12B shows a binarized image generated by performing a binarization processing of the planar image.

DESCRIPTION OF EMBODIMENTS

Figure 1:
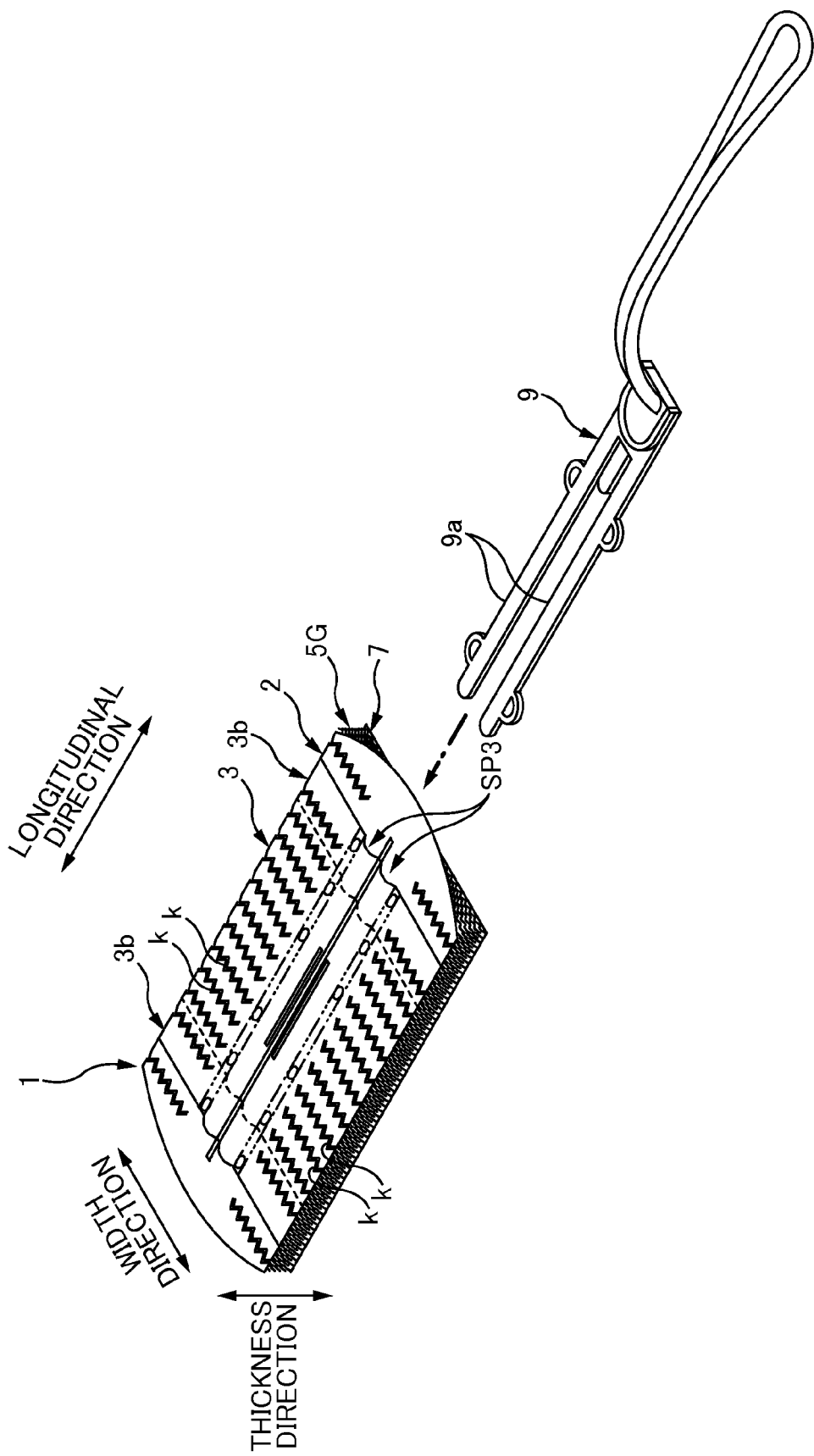
FIG. 1 is a perspective view of a cleaning web member 1.

At least the following matters will be made clear by the explanation in the present specification and the description of the accompanying drawings.
A manufacturing apparatus for manufacturing a cleaning web member by intermittently cutting a continuous web member at a product pitch in a transport direction,
the continuous web member having
a base sheet continuous in the transport direction and
a fiber bundle placed on and secured to the base sheet with a direction of fibers being along the transport direction, including:
an intermittent transport mechanism that intermittently transports the continuous web member in the transport direction;
a cutter mechanism
that is disposed downstream from the intermittent transport mechanism in the transport direction, and
that produce a downstream end portion of the continuous web member as the cleaning web member by cutting and separating the downstream end portion from the continuous web member while transport of the continuous web member is suspended;

a sensor
that measures a displacement amount of a stop position of a predetermined region of the continuous web member from a target stop position, while transport of the continuous web member is suspended, the measurement being performed at a measurement position which is a position upstream from the intermittent transport mechanism in the transport direction,
that includes
an imaging section that, while transport of the continuous web member is suspended,
images one surface of the continuous web member at an imaging position which is the measurement position, and
generates a data of a planar image of the one surface as a planar image data, and
a displacement-amount computation section that computes the displacement amount based on the position of an area in which the predetermined region is imaged and which is within the planar image of the planar image data; and
a control section that controls a transport amount related to the intermittent transport by the intermittent transport mechanism based on information of the displacement amount output from the sensor.

According to the manufacturing apparatus for a cleaning web member described above, the sensor measures the displacement amount of the stop position of the predetermined region of the continuous web member whose transport is suspended, from the target stop position. And, the measurement is performed based on the position of the imaged area of the predetermined region within the planar image, in which the one surface of the continuous web member whose transport is suspended is imaged. Therefore, the predetermined region can be identified reliably, and, as a result, it is ensured that the sensor can compute the displacement amount related to the predetermined region without missing passing of the predetermined region. Thus, the control section can perform the intermittent suspension corresponding to the predetermined region of the continuous web member with high accuracy without failing.

Also, the planar image data used for computation of the displacement amount is generated, not by imaging the continuous web member that is moving by transport, but by imaging the continuous web member whose transport is suspended. Therefore, the displacement amount computed based on the planar image data accurately indicates the displacement amount of the stop position of the predetermined region from the target stop position. Since the control section controls the transport amount of the intermittent transport mechanism based on such an accurately measured displacement amount, the precision of the stop position of the continuous web member is also improved.

In the manufacturing apparatus for a cleaning web member described above, preferably,
the manufacturing apparatus further includes a binarization section that, at a time of generating a binarized image based on the planar image data, performs a binarization processing so that an image defined by one of the two values of the binarized image includes an area in which the predetermined region is imaged and which is within the planar image, and
the displacement-amount computation section computes the displacement amount based on the position of the area in which the predetermined region is imaged and which is within the binarized image.

According to the manufacturing apparatus for a cleaning web member described above, the sensor computes the displacement amount related to the stop position of the predetermined region by performing the binarization processing, etc. of the planar image data in which the one surface of the continuous web member whose transport is suspended is imaged. In this processing, setting a threshold for the binarization processing makes it possible to reliably identify the imaged area of the predetermined region within the binarized image. Therefore, it is ensured that the sensor can compute the displacement amount related to the predetermined region without missing passing of the predetermined region. Thus, the control section can perform the intermittent suspension corresponding to the predetermined region of the continuous web member with high accuracy without failing.

In the manufacturing apparatus for a cleaning web member described above, preferably,
a weld bonding device is disposed upstream from the intermittent transport mechanism in the transport direction,
the weld bonding device
integrally bonds a multilayer body together by forming a welded-bonded portion in the multilayer body, and
produces the continuous web member,
the multilayer body having an auxiliary sheet, the base sheet, and the fiber bundle continuous in the transport direction,
the welded-bonded portion extends straight in a width direction orthogonal to the transport direction,
a target formation position of the welded-bonded portion in the transport direction is a position corresponding to a center position of the cleaning web member,
the welded-bonded portion serves as a boundary partitioning a space between the auxiliary sheet and the base sheet into a pair of spaces which are adjacent to each other,
the pair of spaces serve as spaces into which two insertion portions of a handle member of the cleaning web member are inserted to secure the handle member to the cleaning web member during use of the cleaning web member, and
the predetermined region is the welded-bonded portion.

According to the manufacturing apparatus for a cleaning web member described above, when the welded-bonded portion is formed, the position corresponding to the center position of the cleaning web member is the target formation position. And, when the sensor computes the displacement amount related to the stop position of the continuous web member, the welded-bonded portion is the predetermined region. Based on the thus-computed displacement amount, the control section controls the transport amount of the intermittent transport mechanism. Therefore, the continuous web member is cut by the cutter mechanism in a state where the position corresponding to the center position of the cleaning web member in the continuous web member is accurately placed with respect to the cutter mechanism. That is, the welded-bonded portion will be formed accurately at the center position of the cleaning web member manufactured by this cutting. During use of the cleaning web member, the handle member is attached to the cleaning web member because of the welded-bonded portion. Thus, the cleaning web member permitting accurate attachment of the handle member to the center position thereof can be manufactured, and, as a result, the cleaning web member easy to use can be manufactured.

In the manufacturing apparatus for a cleaning web member described above, preferably, in the weld bonding device, the multilayer body is transported intermittently in the transport direction, the weld bonding device integrally bonds the multilayer body together and produces the continuous web member by sandwiching the multilayer body whose transport is suspended between a pair of welding heads of the weld bonding device in a thickness direction and forming the welded-bonded portion at the sandwiched region, the weld bonding device includes a movement mechanism that moves the pair of welding heads in the transport direction for changing a position of the pair of welding heads in the transport direction, a second sensor that measures a displacement amount of a formation position of the welded-bonded portion of the continuous web member from the target formation position, while transport of the continuous web member is suspended, the measurement being performed at a second measurement position which is a position downstream from the pair of welding heads in the transport direction, that includes a second imaging section that, while transport of the continuous web member is suspended, images the one surface of the continuous web member and generates a data of a planar image of the one surface as a planar image data, a second binarization section that, at a time of generating a binarized image based on the planar image data, performs a binarization processing so that an image defined by one of the two values of the binarized image includes an area in which the welded-bonded portion is imaged and which is within the planar image, and a second displacement-amount computation section that computes the displacement amount based on the position of the area in which the welded-bonded portion is imaged and which is within the binarized image, and a second control section that, by controlling the movement mechanism based on information on the displacement amount output from the second sensor, changes the position of the pair of welding heads in the transport direction toward a direction in which the displacement amount decreases.

According to the manufacturing apparatus for a cleaning web member described above, the displacement amount of the formation position of the welded-bonded portion in the continuous web member from the target formation position is computed. And, based on the computed displacement amount, the second control section adjusts the position of the pair of welding heads in the transport direction toward the direction in which the displacement amount decreases. Thus, the welded-bonded portion can be formed at a region corresponding to the center position of the cleaning web member in the continuous web member with high position precision.

Also, since the computation of the displacement amount is performed based on data of the planar image which is imaged while transport of the continuous web member is suspended, the computed displacement amount accurately indicates the displacement amount of the stop position of the welded-bonded portion from the target stop position. Based on such an accurately measured displacement amount, the control section changes the position of the pair of welding heads. This also effectively contributes to the formation of the welded-bonded portion with high position precision described above.

In the manufacturing apparatus for a cleaning web member described above, preferably, an edge cutter device is disposed upstream from the intermittent transport mechanism in the transport direction, the edge cutter device cuts edges of the base sheet in a width direction into a wave shape having mounds and troughs alternately, the width direction being orthogonal to the transport direction, the edge cutter device cuts the mounds so that each unit corresponding to the cleaning web member has one mound at each of the edges of the base sheet and so that the position of the crest of the mound corresponds to a center position of the cleaning web member, the cutter mechanism cuts the continuous web member at a position of each of the troughs which serves as a target cut position, and produces the cleaning web member in which cut regions serve as tips of a brush section, and the predetermined region is the trough of the edge of the base sheet.

According to the manufacturing apparatus for a cleaning web member described above, the edge cutter device cuts the edges of the base sheet into a wave shape so that the position corresponding to the center position of the cleaning web member coincides with the crest of the mound, and the sensor computes the displacement amount related to the stop position of the continuous web member using a trough between mounds adjacent to each other in the transport direction as the predetermined region described above. Based on the thus-computed displacement amount, the control section controls the transport amount of the intermittent transport mechanism. Thus, the continuous web member can be cut by the cutter mechanism with the position of the trough on the continuous web member being aligned accurately with respect to the cutter mechanism, and, as a result, the cleaning web member with high size precision can be produced.

A manufacturing method for manufacturing a cleaning web member by intermittently cutting a continuous web member at a product pitch in a transport direction, the continuous web member having a base sheet continuous in the transport direction and a fiber bundle placed on and secured to the base sheet with a direction of fibers being along the transport direction, including:

transporting intermittently the continuous web member in the transport direction by an intermittent transport mechanism;

producing a downstream end portion of the continuous web member as the cleaning web member by cutting and separating with a cutter mechanism the downstream end portion from the continuous web member while transport of the continuous web member is suspended, the cutter mechanism being disposed downstream from the intermittent transport mechanism in the transport direction;

measuring a displacement amount of a stop position of a predetermined region of the continuous web member from a target stop position while transport of the continuous web member is suspended, the measuring being performed at a measurement position which is a position upstream from the intermittent transport mechanism in the transport direction, the measuring including generating a data of a planar image of a one surface as a planar image data by imaging at an imaging position the one surface of the continuous web member while transport of the continuous web member is suspended, the imaging position being the measurement position computing the displacement amount based on the position of an area in which the predetermined region is imaged and which is within the binarized image; and changing a transport amount related to the intermittent transport by the intermittent transport mechanism based on information of the measured displacement amount.

According to the manufacturing method for a cleaning web member described above, measured is the displacement amount of the stop position of the predetermined region of the continuous web member whose transport is suspended, from the target stop position. And, the measurement is performed based on the position of the imaged area of the predetermined region within the planar image, in which the one surface of the continuous web member whose transport is suspended is imaged. Therefore, the predetermined region can be identified reliably, and, as a result, it is ensured that the displacement amount related to the predetermined region can be computed without missing passing of the predetermined region. Thus, it is possible to perform the intermittent suspension corresponding to the predetermined region of the continuous web member with high accuracy without failing.

Also, the planar image data used for computation of the displacement amount is generated, not by imaging the continuous web member that is moving by transport, but by imaging the continuous web member whose transport is suspended. Therefore, the displacement amount computed based on the planar image data accurately indicates the displacement amount of the stop position of the predetermined region from the target stop position. Since the transport amount of the intermittent transport mechanism is controlled based on such an accurately measured displacement amount, the precision of the stop position of the continuous web member is also improved.

Present Embodiment

Figure 2A:
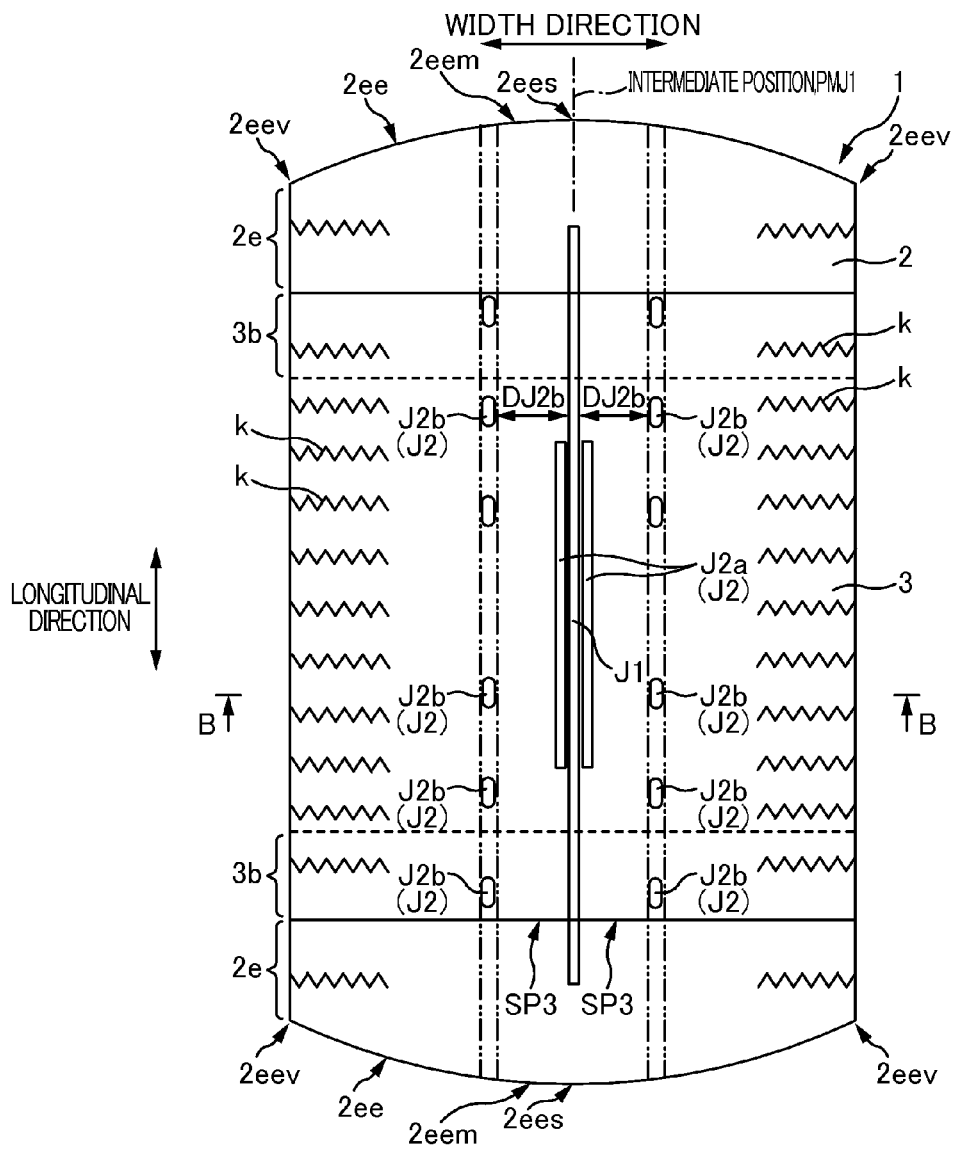
FIG. 2A is a plan view of the cleaning web member 1.

FIG. 1 is a perspective view of a cleaning web member 1 manufactured by a manufacturing apparatus and method of this embodiment. FIG. 2A is a plan view thereof, and FIG. 2B is a cross-sectional view taken along line B-B in FIG. 2A.

As shown in FIGS. 1 and 2A, a planar shape of the cleaning web member 1 is a substantially rectangular shape having the longitudinal direction and the width direction. Also as shown in FIGS. 1 and 2A, in the thickness direction, the cleaning web member 1 includes: a base sheet 2; an auxiliary sheet 3 that covers the top surface of the base sheet 2 and forms between itself and the base sheet 2 hollows SP3 and SP3 into which a handle member 9 is inserted and secured; a fiber bundle member 5G that covers the bottom surface of the base sheet 2 and forms a main brush section; and a strip sheet 7 that is placed on the bottom surface of the fiber bundle member 5G and serves as an auxiliary brush section. Insertion portions 9a and 9a of a fork-shaped part of the handle member 9 are inserted into the hollows SP3 and SP3, and the bottom surface and both end faces in the width direction of the cleaning web member 1 are used as wiping surfaces. Thus, the cleaning web member 1 is used for cleaning of a tabletop, etc.

Figure 2B:
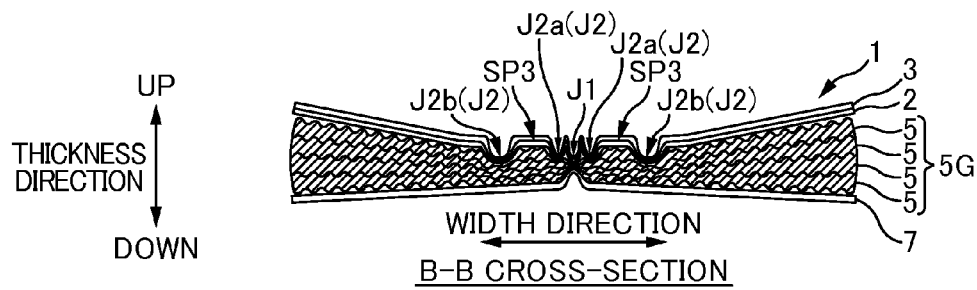
FIG. 2B is a cross-sectional view taken along line B-B in FIG. 2A.

As shown in FIG. 2B, the fiber bundle member 5G is a member having a plurality of fiber bundles 5 stacked in the thickness direction. Although four fiber bundles 5 are stacked in the thickness direction to form a four-layer structure in the illustrated example, the number of layers is not limited to this. For example, one bundle may be formed to give the fiber bundle member 5G of a single-layer structure. Otherwise, two bundles, three bundles, or five or more bundles may be formed to give the fiber bundle member 5G of a multi-layer structure having two layers, three layers, or five or more layers.

Each of the fiber bundles 5 has a number of continuous fibers having a size of 1 to 50 dtex, preferably 2 to 10 dtex. The size may be the same for all the continuous fibers, or may be different among the continuous fibers. The fiber direction of the continuous fibers is along the width direction of the cleaning web member 1. Thus, basically, both end portions in the width direction serve as tip portions of the brush section. However, since such continuous fibers can be flexibly bent, the tip portions of the continuous fibers bend toward the bottom surface of the cleaning web member 1. This enables the bottom side of the cleaning web member 1 to also serve as a tip portion of the brush section. Although all the continuous fibers of the fiber bundles 5 are thermoplastic fibers in this example, only part of the continuous fibers may be thermoplastic fibers. Examples of such fiber materials include single fibers such as polyethylene (PE), polypropylene (PP), polyethylene terephthalate (PET), nylon (Ne), and rayon and composite fibers having a core made of polypropylene (PP) or polyethylene terephthalate (PET) and a sheath made of polyethylene (PE).

The fiber bundles 5 having such continuous fibers can be obtained by opening tows 5T (FIG. 3), for example, as in the illustrated example although the invention is not limited to this. For example, they may be obtained from slit yarns (threads made of slit fiber (fiber produced by slitting a film and drawing the slit pieces)), split yarns (threads made of split fiber (fiber produced by chopping an elongated film into a web structure), etc.

The strip sheet 7 is formed of a flexible sheet such as a nonwoven fabric made of thermoplastic fibers, a nonwoven fabric including thermoplastic fibers, a thermoplastic resin film, etc., and is a substantially rectangular shape having approximately the same planar size as the base sheet 2. On the end of the strip sheet 7 in the width direction, formed are zigzag cuts (not shown) along the width direction at intervals in the longitudinal direction. With these cuts, a plurality of zigzag strips (not shown) extending in the width direction are formed on the end of the strip sheet 7 in the width direction. Note however that the strip sheet 7 is not necessarily required, i.e., is not an essential component.

As shown in FIGS. 1, 2A, and 2B, both the base sheet 2 and the auxiliary sheet 3 have a planar shape of an approximate rectangle. The base sheet 2 and the auxiliary sheet 3 have the same size in the width direction, but are not the same in the longitudinal direction. For example, both end portions of the auxiliary sheet 3 are folded toward the center in the longitudinal direction and thermally welded to form folded portions 3b, whereby the base sheet 2 is longer than the auxiliary sheet 3. Therefore, when the auxiliary sheet 3 are placed on the top of the base sheet 2, both end portions 2e and 2e of the base sheet 2 in the longitudinal direction project from the respective ends of the auxiliary sheet 3 in the longitudinal direction by a predetermined length. Thus, the edges 2ee and 2ee of the base sheet 2 in the longitudinal direction define the outline of the cleaning web member 1.

Moreover, as shown in FIG. 2A, the end portions 2e and 2e of the base sheet 2 in the longitudinal direction both have a substantially arc shape. Specifically, each of the edges 2ee and 2ee at both ends in the longitudinal direction has its crest 2ees at the center in the width direction, having a mound shape projecting toward a longitudinal end. And, the projection amount decreasing gradually from the center toward both ends in the width direction, the edge 2ee has least-projecting troughs 2eev and 2eev at both ends. A mound 2eem, which is a portion of the edge 2ee projecting in the longitudinal direction, is used as a handle of the cleaning web member 1 when the user inserts the handle member 9 into the hollows SP3 and SP3 of the cleaning web member 1.

Furthermore, in this example, both the base sheet 2 and the auxiliary sheet 3 have zigzag cuts k, k, . . . on the ends thereof in the width direction at intervals in the longitudinal direction, the zigzag cuts k, k, . . . extending along the width direction. With these cuts k, k, . . . , a plurality of zigzag strips extending in the width direction are formed on the ends of the base sheet 2 and the auxiliary sheet 3 in the width direction. Note however that these cuts k, k, . . . are not necessarily required, i.e., are not an essential component.

The base sheet 2 and the auxiliary sheet 3 are formed by a nonwoven fabric made of thermoplastic fibers or by a nonwoven fabric including thermoplastic fibers. Examples of thermoplastic fibers include: PE fiber; PP fiber; PET fiber; composite fiber of PE and PET (e.g., composite fiber having a core-sheath structure of a PE core and a PET sheath); and composite fiber of PE and PP (e.g., composite fiber having a core-sheath structure of a PET core and a PE sheath). Examples of the form of the nonwoven fabric include: a thermal-bonded nonwoven fabric; a spunbonded nonwoven fabric; and a spunlaced nonwoven fabric. However, the material of the base sheet 2 and the auxiliary sheet 3 is not limited to the nonwoven fabrics described above. For example, a thermoplastic resin film made of PE, PP, etc., or a laminate sheet of a nonwoven fabric and a resin film may be employed.

The auxiliary sheet 3, the base sheet 2, the four fiber bundles 5 of the fiber bundle member 5G, and the strip sheet 7 are stacked in the thickness direction in this order; adjacent members thereof in the thickness direction are bonded together by forming a plurality of welded-bonded portions J1, J2, J2, . . . , as shown in FIGS. 2A and 2B. The welded-bonded portions J1, J2, J2, . . . are formed by ultrasonic welding, and during the welding, the regions to be welded are pressed in the thickness direction. Therefore, the welded-bonded portions J1, J2, J2, . . . are formed in the shape of a recess compressed in the thickness direction.

In this example, the welded-bonded portions J1, J2, J2, . . . are classified, from the standpoint of the members to be bonded, into substantially two kinds: a first welded-bonded portion J1 and a second welded-bonded portion J2. In the first welded-bonded portion J1, bonded are all the layers in the thickness direction (i.e., all components of the auxiliary sheet 3, the base sheet 2, the four fiber bundles 5 of the fiber bundle member 5G, and the strip sheet 7). In the second welded-bonded portion J2, only members in upper layers in the thickness direction are bonded and lower-layer members are not bonded. For example, the members bonded in the second welded-bonded portion J2 are ones that are in the upper side: the auxiliary sheet 3; the base sheet 2; and the two fiber bundles 5 of the fiber bundle member 5G located closer to the base sheet 2. On the other hand, the strip sheet 7 and the two fiber bundles 5 of the fiber bundle member 5G closer to the strip sheet 7, which are in the lower side, are not bonded to any member in the second welded-bonded portion J2.

As the first welded-bonded portion J1, a first linear-welded portion J1 is formed as a continuous straight line in the longitudinal direction at the center in the width direction. The first linear-welded portion J1 extends through the entire length of the base sheet 2 except for the mounds 2eem and 2eem at the ends of the base sheet 2.

The second welded-bonded portions J2 are classified into two types: a pair of second linear-welded portions J2a and J2a; and a plurality of islandlike-welded portions J2b, J2b, . . . . The second linear-welded portions J2a and J2a are shorter than the first linear-welded portion J1, extend in a continuously straight manner parallel to the first linear-welded portion J1, and are formed on both sides of the first linear-welded portion J1 in the width direction so that the portion J1 is sandwiched therebetween. The islandlike-welded portions J2b, J2b, . . . are formed separately like islands. The second linear-welded portions J2a and J2a are formed adjacent to the first linear-welded portion J1. The islandlike-welded portions J2b, J2b, . . . are formed at intervals along the longitudinal direction at positions on both sides of the first linear-welded portion J1, the positions being located at a predetermined distance DJ2b from the portion J1. The predetermined distance DJ2b is set to approximately the same size as the width between the insertion portions 9a and 9a of the fork-shaped part of the handle member 9. Therefore, in cooperation with the first linear-welded portion J1 and the second linear-welded portions J2a, the islandlike-welded portions J2b, J2b, . . . partition the space between the auxiliary sheet 3 and the base sheet 2 as a pair of spaces SP3 and SP3, the spaces SP3 and SP3 being adjacent to each other and being separated by the first linear-welded portion J1 and the second linear-welded portions J2a as a boundary. The pair of spaces SP3 and SP3 serve as the hollows SP3 and SP3 into which the two insertion portions 9a and 9a of the handle member 9 are inserted at the time of use of the cleaning web member 1.

Figure 3:
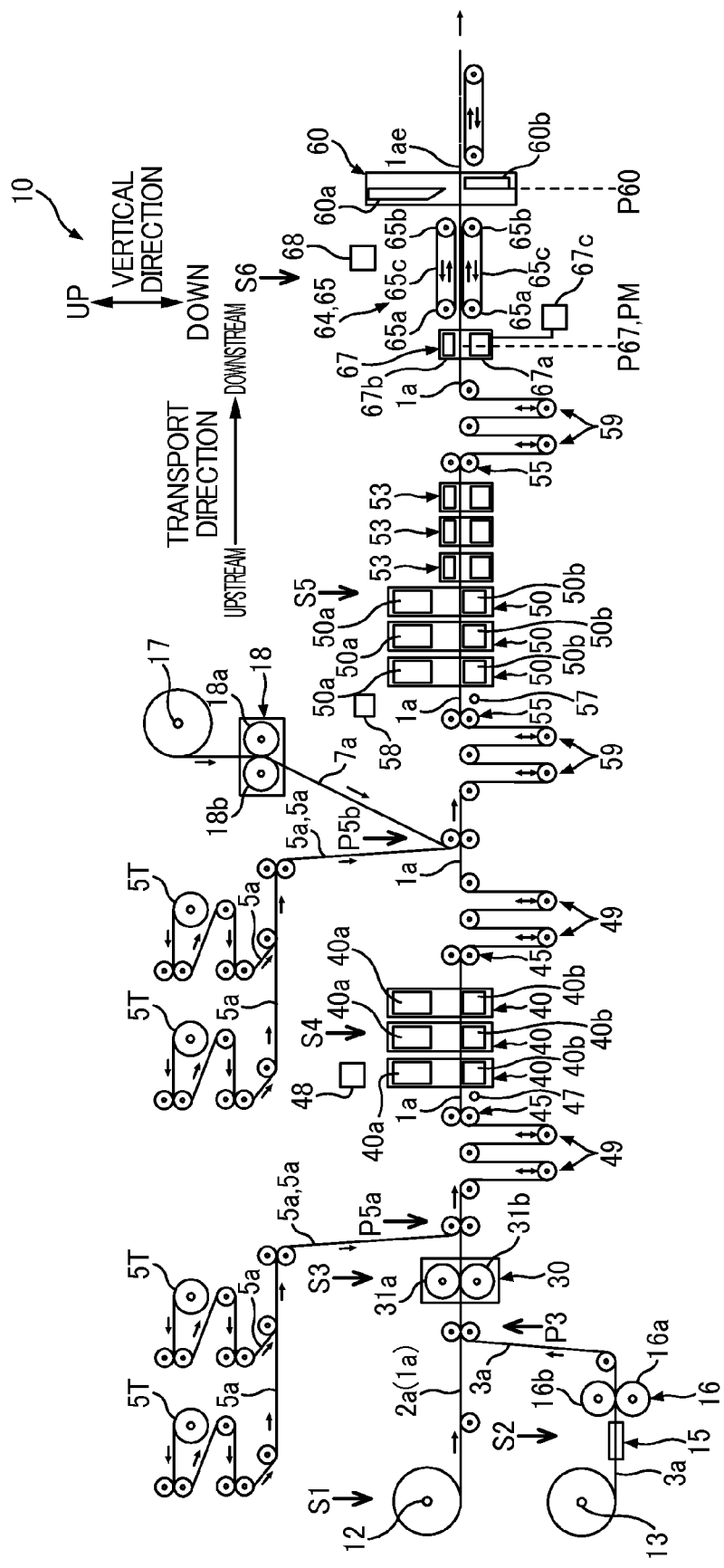
FIG. 3 is a schematic side view of a manufacturing line 10 for the cleaning web member 1.

FIG. 3 is a schematic side view of a manufacturing line 10 for the cleaning web member 1.

In the manufacturing line 10, the base sheet 2 is fed out from an appropriate reel device 12, and transported continuously along a predetermined transport path, in the form of a continuous sheet 2a that continues in the transport direction. On the transport path, disposed sequentially are the following positions: a merging position P3 of the auxiliary sheet 3; a merging position P5a of the first- and second-layer fiber bundles 5; and a merging position P5b of the third- and fourth-layer fiber bundles 5 and the strip sheet 7. Also, disposed are sections S3, S4, S5, and S6 for performing various types of processing such as welding and cutting.

Thus, at each of the merging positions P3, P5a, and P5b, each of the members 3, 5, and 7 is fed toward and placed on the base sheet 2a; at this stage, the members 3, 5, and 7 are respectively in the form of continuous members 3a, 5a, and 7a continuing in the transport direction. Also, in the sections S3, S4, S5, and S6, welding processing and cutting processing are performed. Every time such feeding and processing are performed, a semi-finished product 1a of the cleaning web member 1 sequentially changes its form, and finally a downstream end portion 1ae in the transport direction of the semi-finished product 1a is separated at a product pitch P1, so that the separated downstream end portion 1ae is produced as the cleaning web member 1. The produced cleaning web member 1 is then sent to downstream processes such as packing.

As the transport mechanism for transport of the semi-finished product 1a, the following devices are used: a suction belt conveyer whose belt surface serving as a placement surface has a function to suck and hold a thing; a belt conveyer 65 in which the semi-finished product 1a is transported through a space between a pair of upper and lower endless belts 65c and 65c; transport rollers 45 and 55; and the like.

The manufacturing line 10 will be described hereinafter. In the following description, of two directions orthogonal to the transport direction of the manufacturing line 10, the direction which is not the thickness direction of the semi-finished product 1a (the direction perpendicular to the paper plane in FIG. 3) is also referred to as a "CD direction." The CD direction corresponds to the longitudinal direction of the cleaning web member 1, and the transport direction corresponds to the width direction of the cleaning web member 1. In other words, as shown in a schematic bottom view of FIG. 4, the semi-finished product 1a is transported in a so-called "transverse direction" flowing, in which the direction corresponding to the longitudinal direction of the cleaning web member 1 is in the CD direction.

Also, the thickness direction and width direction of the semi-finished product 1a of the cleaning web member 1 are respectively the up-down direction and the CD direction. In this example, the cleaning web member 1 is generally manufactured being oriented upside down from the orientation at the time of use. In other words, the cleaning web member 1 is manufactured in a state where the top surface thereof during use faces down (see FIG. 4) and the bottom surface thereof during use faces up in the manufacturing line 10. However, the up/down positional relationship may be inverted. In this case, the placement of the manufacturing line 10 in FIG. 3 is turned upside down.

Figure 4:
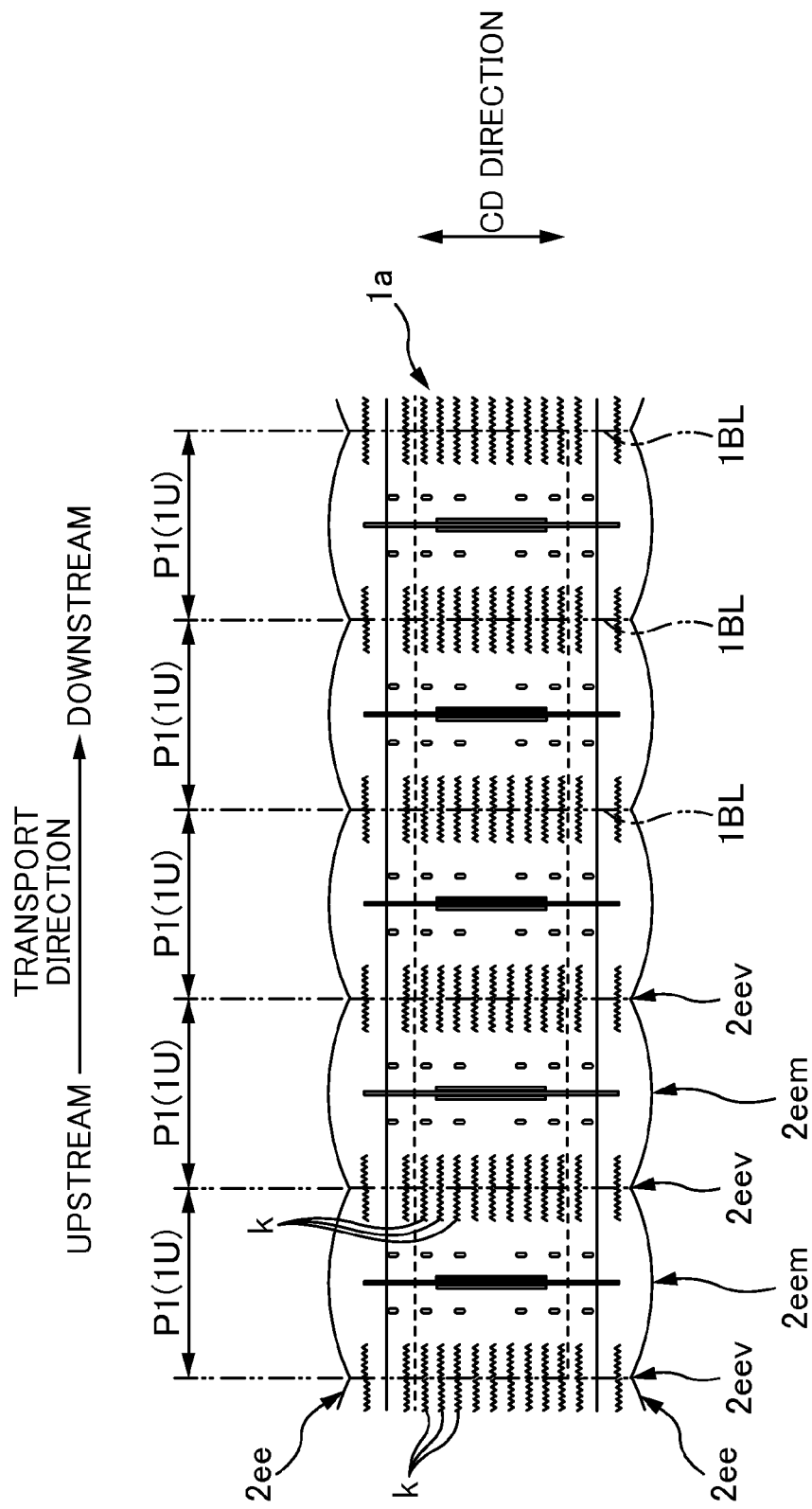
FIG. 4 is a schematic bottom view of a semi-finished product 1a of the cleaning web member 1 being transported between a downstream-side welding section S5 and a separation section S6.

The semi-finished product 1a passing through the manufacturing line 10 is a series of unit portions 1U each corresponding to the cleaning web member 1 arranged side by side at the product pitch P1 in the transport direction as shown in FIG. 4. The unit portion 1U of the semi-finished product 1a is hereinafter referred to as a "unit semi-finished product 1U." Since the semi-finished product 1a is transported in the transverse direction flowing as described above, the length of the unit semi-finished product 1U in the transport direction (product pitch P1) is substantially the same as the size of the cleaning web member 1 in the width direction.

As shown in FIG. 3, a base-sheet feeding section S1 that feeds out the base sheet 2a from the reel device 12 is disposed at an upstream position on the manufacturing line 10.

Also, an auxiliary-sheet production section S2 that produces the auxiliary sheet 3a is disposed under the section S1. In the auxiliary-sheet production section S2, the auxiliary sheet 3a wound in a coil shape is fed out from an appropriate reel device 13 in the form of a continuous sheet 3a. Then, during passing through a folding-up device 15, both end portions of the sheet 3a in the CD direction are folded toward the center in the CD direction. Then, during passing through a heat-seal device 16 disposed downstream from the folding-up device 15, the folded end portions are fixed by welding to the folded state in an appropriate welding pattern, whereby the folded portions 3b and 3b are formed on both ends of the auxiliary sheet 3a in the CD direction.

As an example of the folding-up device 15, well-known folding guide plates disposed facing the ends of the auxiliary sheet 3a in the CD direction may be used.

As an example of the heat-seal device 16, a device provided with a pair of upper and lower seal rollers 16a and 16b which rotate in the transport direction may be used. Specifically, on the outer circumferential surface of the lower seal roller 16a that is heated, a protrusion section (not shown) having a shape corresponding to the above welding pattern is provided. The outer circumferential surface of the upper seal roller 16b is smooth to receive the protrusion. Therefore, when the auxiliary sheet 3a passes the nip between the pair of rollers 16a and 16b, areas of the auxiliary sheet 3a coming into contact with the protrusion are selectively compressed in the thickness direction; at this stage, the areas are heated and melted. As a result, the folded end portions of the auxiliary sheet 3a are fixed by welding in the folded state, resulting in the folded portions 3b.

Then, the auxiliary sheet 3a is transported to the merging position P3 at which the auxiliary sheet 3a merges with the base sheet 2a on the transport path. At the merging position P3, the auxiliary sheet 3a is placed on the bottom surface of the base sheet 2a, and then transported in the transport direction integrally with the base sheet 2a. That is, the semi-finished product 1a of the cleaning web member 1 at this point is in a state where the auxiliary sheet 3a in the form of the continuous sheet 3a is placed on the bottom surface of the base sheet 2a.

Thereafter, the semi-finished product 1a passes through a cutting section S3. In the cutting section S3, a cutter roller device 30 (corresponding to the "edge cutter device") is disposed. During passing through the device 30, the edges 2ee and 2ee of the base sheet 2a in the CD direction are cut in a wave shape by the device 30 (see FIG. 4). This wave shape has the mounds 2eem and the troughs 2eev alternately appearing in the transport direction; and the pitch of the troughs 2eev in the transport direction (which is also the pitch of the mounds 2eem) is the same as the size P1, in the transport direction, of the unit semi-finished product 1U corresponding to one cleaning web member 1. Therefore, in the separation section S6 that is the final section S6 of this manufacturing line 10, when the cleaning web member 1 is separated from the semi-finished product 1a by a cutter mechanism 60, the cleaning web member 1 can be produced by cutting the semi-finished product 1a at the position of the trough 2eev, the cleaning web member 1 having one mound 2eem at each edge 2ee thereof in the longitudinal direction.

Concurrently with the foregoing cutting in a wave shape, the cutter roller device 30 forms the zigzag cuts k, k, . . . in the auxiliary sheet 3a and the base sheet 2a at intervals in the CD direction (see FIG. 4). The cuts k, k, . . . are formed at intervals in the transport direction; that is, they are not formed in the central area of the unit semi-finished product 1U in the transport direction, but only formed in the end areas thereof. Thus, in a completed cleaning web member 1, the zigzag strips are formed in the ends of the base sheet 2 and the auxiliary sheet 3 in the width direction.

The cutter roller device 30 having the foregoing functions includes a pair of upper and lower rollers 31a and 31b that rotate in the transport direction in synchronization with the transport operation of the semi-finished product 1a. The lower roller 31b has cutter blades (not shown) on its outer circumferential surface, the shape of the cutter blades corresponding to the wave shape of the edges 2ee and the zigzag shape of the cuts k, k, . . . . The upper roller 31a has receiver blades (not shown) on its outer circumferential surface, which receive the cutter blades. Therefore, when the semi-finished product 1a passes the nip between the pair of rollers 31a and 31b, the semi-finished product 1a is cut at positions where it comes into contact with the cutter blades. Thereby, the edges 2ee and 2ee of the semi-finished product 1a is shaped into the wave shape, and the zigzag cuts k, k, . . . are formed in the portions of the semi-finished product 1a other than the edges 2ee and 2ee (FIG. 4).

Thereafter, as shown in FIG. 3, the semi-finished product 1a passes through the merging position P5a of the first and second fiber bundles 5a and 5a. At this merging position P5a, the first fiber bundle 5a and the second fiber bundle 5a are stacked, and they are fed in an integrated manner continuously in the transport direction; the first fiber bundle 5a is one that is obtained by opening the tows 5T in a processing such as an opening (processing of spreading a bundle of tows 5T approximately uniformly in the CD direction to have a predetermined size in the CD direction); the second fiber bundle 5a is one that is obtained by opening the tows 5T in a processing such as the opening. Thus, the first-layer fiber bundle 5a and the second-layer fiber bundle 5a are placed on the top surface of the base sheet 2a of the semi-finished product 1a. Thereafter, the semi-finished product 1a is transported downstream in the transport direction in a state where the auxiliary sheet 3a, the base sheet 2a, and the first- and second-layer fiber bundles 5a are stacked and integrated. Note that the fiber direction of the fiber bundles 5a and 5a is in the transport direction.

Then, the semi-finished product 1a passes through the upstream-side welding section S4. In the upstream-side welding section S4, an ultrasonic welding device 40 is disposed. During passing through the device 40, the semi-finished product 1a is subjected to ultrasonic welding processing, whereby the second linear-welded portions J2a and the plurality of islandlike-welded portions J2b, J2b, . . . described above are formed in the semi-finished product 1a, and thus the semi-finished product 1a is bonded and integrated. In other words, the auxiliary sheet 3a, the base sheet 2a, the first-layer fiber bundle 5a, and the second-layer fiber bundle 5a are bonded integrally by welding at the positions of the second linear-welded portions J2a and the islandlike-welded portions J2b, J2b, . . . (FIGS. 2A and 2B).

The above ultrasonic welding processing is performed by transporting the semi-finished product 1a intermittently. In other words, in the upstream-side welding section S4, disposed is an intermittent transport device for intermittently transporting the semi-finished product 1a. Also, in this example, three ultrasonic welding devices 40, 40, and 40 having the same structure are arranged side by side at the product pitch P1 in the transport direction. By this arrangement, every time when the transport of the semi-finished product 1a is stopped, the second linear-welded portions J2a and the islandlike-welded portions J2b are formed simultaneously for three unit semi-finished products 1U in this case, as an example of a plurality of unit products. Note that the number of devices is not limited to this. One device, two devices, or even four or more devices may be used.

The intermittent transport device includes: transport rollers 45 and 45 that transport the semi-finished product 1a; a servomotor (not shown) as a drive source for driving the transport rollers 45 and 45; a detection sensor 47 that detects passing of three unit semi-finished products 1U and outputs a detection signal, the number of unit semi-finished products 1U being the same as the number of ultrasonic welding devices disposed; and a control section 48 that controls the operation of the servo motor based on the detection signal from the detection sensor 47 and a welding completion signal output from a state monitor sensor (not shown) of each ultrasonic welding device 40.

The control section 48 is a computer, a programmable logic controller (PLC), or the like, for example, and has a processor and a memory. The processor reads a control program stored previously in the memory and executes the program, thereby basically controlling the operation of the servo motor of the intermittent transport device. In addition, the control section 48 controls the operation of the ultrasonic welding devices 40, 40, and 40.

The detection sensor 47 is a phototube, for example, and detects passing of the troughs 2eev of the edges 2ee of the semi-finished product 1a in the CD direction. Every time when the detection sensor 47 detects passing of a trough 2eev three times, the detection sensor 47 transmits the detection signal to the control section 48. The control section 48, having received the detection signal, stops the transport of the semi-finished product 1a. Then, the control section 48 lowers an upper head 40a of each of the ultrasonic welding devices 40 toward a lower head 40b thereof located under the semi-finished product 1a, whereby the semi-finished product 1a is pinched in the thickness direction between the bottom surface of the upper head 40a and the top surface of the lower head 40b. At least on the top surface of the lower head 40b, formed are protrusions (not shown) whose shapes correspond respectively to the second linear-welded portions J2a and the plurality of islandlike-welded portions J2b, Jb2, . . . . Therefore, during the foregoing pinching, the semi-finished product 1a is pinched selectively by the protrusions. Further, at this time, ultrasonic vibration is applied from an ultrasonic vibration generation mechanism (not shown) to at least either one of the upper head 40a and the lower head 40b, whereby portions of the semi-finished product 1a that are in contact with the protrusions are selectively melted, and as a result, the second linear-welded portions J2a and the plurality of islandlike-welded portions J2b, Jb2, . . . are formed in the semi-finished product 1a. Then, the upper head 40a is raised, and once a proximity switch (not shown) as a state monitor sensor has detected arrival of the upper head 40a at its uppermost position, the switch transmits the welding completion signal to the control section 48. Having received this signal, the control section 48 restarts the transport of the semi-finished product 1a so that the next three unit semi-finished products 1U, 1U, and 1U to be welded move to the positions of the ultrasonic welding devices 40, 40, and 40. Thereafter, the above processing is repeated, and thereby the second linear-welded portions J2a and the plurality of islandlike-welded portions J2b, Jb2, . . . are formed for each unit semi-finished product 1U in the semi-finished product 1a.

Sets of dancer rollers 49 and 49 are disposed respectively upstream and downstream from the intermittent transport device. The semi-finished product 1a is wrapped around the dancer rollers 49 and 49, which results in loops of the semi-finished product 1a that protrude downward. Changing the size of the loops of the semi-finished product 1a by moving the dancer rollers 49 and 49 up and down enables smooth accumulation of the semi-finished product 1a sent from upstream during suspension of transport, and also enables smooth discharge of the semi-finished product 1a to be sent downstream during suspension of transport. This makes it possible to prevent the suspension of transport in the upstream-side welding section S4 from affecting the upstream sections and the downstream sections in the transport direction.

Next, the semi-finished product 1a passes through the merging position P5b of the third and fourth fiber bundles 5a and 5a and the strip sheet 7a. At this merging position P5b, the third-layer fiber bundle 5a, the fourth-layer fiber bundle 5a, and the strip sheet 7a are stacked, and they are fed in an integrated manner continuously in the transport direction. Thus, the third-layer fiber bundles 5a, the fourth-layer fiber bundles 5a, and the strip sheet 7a are placed on the top surface of the second-layer fiber bundle 5a of the semi-finished product 1a. Thereafter, the semi-finished product 1a (corresponding to the "multilayer body") is transported downstream in the transport direction in a state where the auxiliary sheet 3a, the base sheet 2a, the first- to fourth-layer fiber bundles 5a, 5a, 5a, and 5a, and the strip sheet 7a are stacked and integrated. Thus, at this stage, the semi-finished product 1a has all the components of the cleaning web member 1.

Note that, like the first- and second-layer fiber bundles 5a and 5a described above, the third- and fourth-layer fiber bundles 5a are also obtained by opening the tows 5T in a processing such as an opening before arriving at the merging position P5b. The fiber direction of the third- and fourth-layer fiber bundles 5a and 5a is in the transport direction.

The strip sheet 7a is fed out from an appropriate reel device 17 in the form of a continuous sheet 7a. Before arriving at the merging position P5b, the foregoing zigzag cuts are formed in the strip sheet 7a by a cutter roller device 18. Specifically, the cutter roller device 18 is disposed between the reel device 17 and the merging position P5b, and has a pair of rollers 18a and 18b that rotate in the transport direction of the strip sheet 7a. One roller 18a has cutter blades (not shown) on its outer circumferential surface, the shape of the cutter blades corresponding to the zigzag shape. The other roller 18b has receiver blades (not shown) on its outer circumferential surface, which receive the cutter blades. Therefore, when the strip sheet 7a passes the nip between the pair of rollers 18a and 18b, the strip sheet 7a comes into contact with the cutter blades, whereby zigzag cuts (not shown) are formed.

Figure 5:
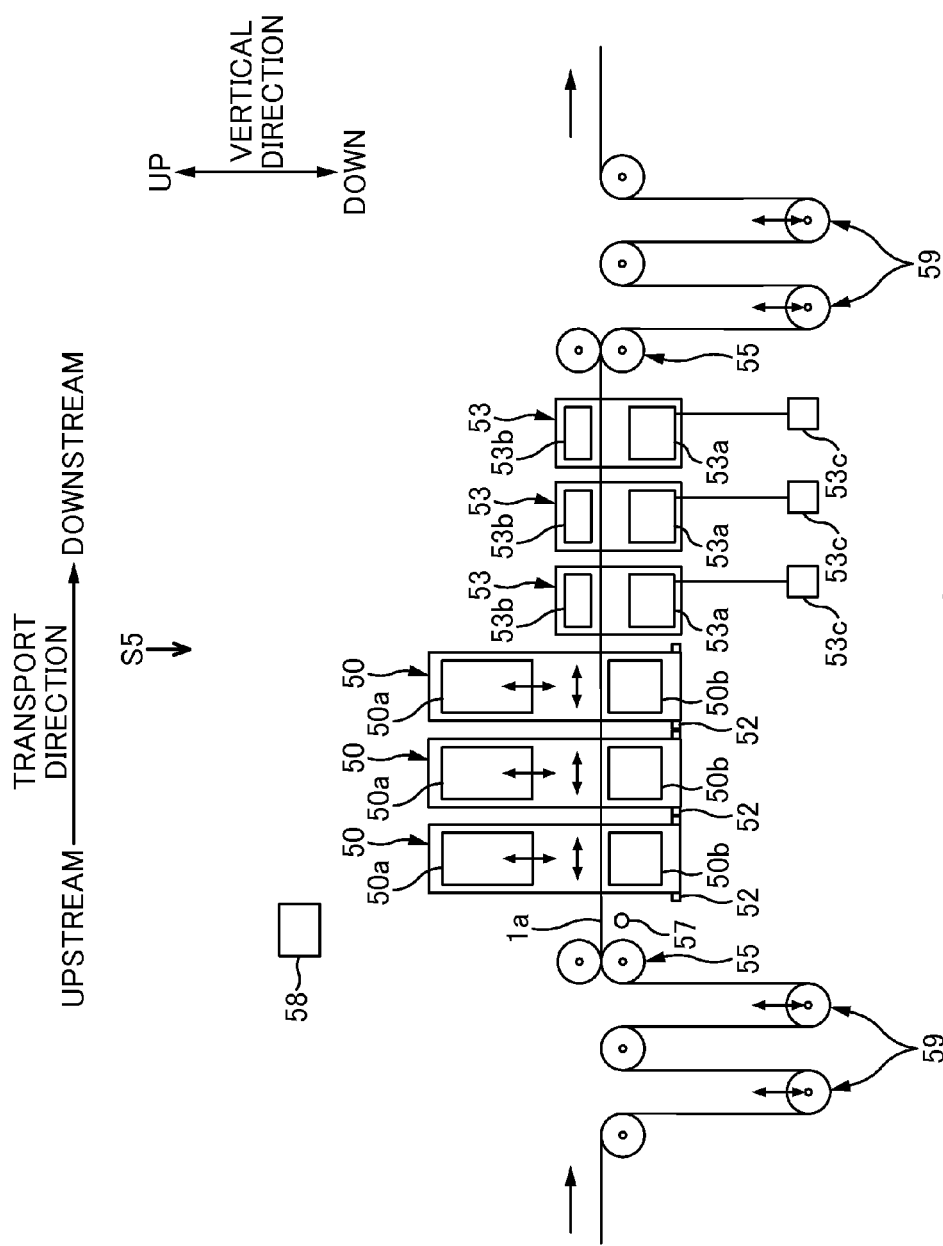
FIG. 5 is an enlarged schematic side view of the downstream-side welding section S5.

Next, the semi-finished product 1a passes through the downstream-side welding section S5. FIG. 5 is an enlarged schematic side view of the downstream-side welding section S5. Also, in the downstream-side welding section S5, an ultrasonic welding device 50 (corresponding to the "weld bonding device") is disposed. During passing through the device 50, the semi-finished product 1a is subjected to ultrasonic welding processing by the device 50. Thereby, the first linear-welded portions J1 (corresponding to the "predetermined regions" and the "linear welded-bonded portions") are formed in the semi-finished product 1a. Thus, all the layers of the semi-finished product 1a throughout the thickness direction are bonded and integrated. In other words, the auxiliary sheet 3a, the base sheet 2a, all of the first- to fourth-layer fiber bundles 5a, 5a, 5a, and 5a, and the strip sheet 7a are bonded integrally by welding at the positions of the first linear-welded portions J1 (FIGS. 2A and 2B).

The above ultrasonic welding processing is also performed by transporting the semi-finished product 1a intermittently. In other words, in the downstream-side welding section S5, disposed is an intermittent transport device for intermittently transporting the semi-finished product 1a. Also, as in the upstream-side welding section S4 described above, three ultrasonic welding devices 50, 50, and 50 are arranged side by side at the product pitch P1 in the transport direction. By this arrangement, every time when the transport of the semi-finished product 1a is stopped, the first linear-welded portions J1 can be formed simultaneously for three unit semi-finished products 1U in this case, as an example of a plurality of unit products. However, as with the case of the upstream-side welding section S4, the number of devices displaced is not limited to this.

The intermittent transport device similarly includes: transport rollers 55 and 55 that transport the semi-finished product 1a; a servo motor (not shown) as a drive source for driving the transport rollers 55 and 55; a detection sensor 57 that detects passing of three unit semi-finished products 1U and outputs a detection signal, the number of unit semi-finished products 1U being the same number as the number of ultrasonic welding devices displaced; and a control section 58 that controls the operation of the servo motor based on the detection signal from the detection sensor 57 and a welding completion signal output from a state monitor sensor (not shown) of each ultrasonic welding device 50.

The control section 58 is a computer, a PLC, or the like, for example, and has a processor and a memory. The processor reads a control program stored previously in the memory and executes the program, thereby basically controlling the operation of the servo motor of the intermittent transport device. In addition, the control section 58 also controls the operation of the ultrasonic welding devices 50.

The detection sensor 57 is a phototube, for example, and detects passing of the troughs 2eev of the edges 2ee of the semi-finished product 1a in the CD direction. Every time when the detection sensor 57 detects passing of a trough 2eev three times, the detection sensor 57 transmits the detection signal to the control section 58. The control section 58, having received the detection signal, stops the transport of the semi-finished product 1a. Then, the control section 58 lowers an upper head 50a (corresponding to the "welding head") of each of the ultrasonic welding devices 50 toward a lower head 50b (corresponding to the "welding head") thereof located under the semi-finished product 1a, whereby the semi-finished product 1a is pinched in the thickness direction between the bottom surface of the upper head 50a and the top surface of the lower head 50b. At least on the top surface of the lower head 50b, formed is a protrusion (not shown) whose shape corresponds to the first linear-welded portions J1. Therefore, during the foregoing pinching, the semi-finished product 1a is pinched selectively by the protrusion. Further, at this time, ultrasonic vibration is applied from an ultrasonic vibration generation mechanism (not shown) to at least either one of the upper head 50a and the lower head 50b, whereby the portion of the semi-finished product 1a that is in contact with the protrusion is selectively melted, and as a result, the first linear-welded portion J1 is formed in the semi-finished product 1a. Then, the upper head 50a is raised, and once a proximity switch (not shown) as a state monitor sensor has detected arrival of the upper head 50a at its uppermost position, the switch transmits the welding completion signal to the control section 58. Having received this signal, the control section 58 restarts the transport of the semi-finished product 1a so that the next three unit semi-finished products 1U, 1U, and 1U to be welded move to the positions of the ultrasonic welding devices 50, 50, and 50. Thereafter, the above processing is repeated, and thereby the first linear-welded portion J1 is formed for each unit semi-finished product 1U in the semi-finished product 1a.

Sets of dancer rollers 59 and 59 are also disposed respectively upstream and downstream from the intermittent transport mechanism in the downstream-side welding section S5. As with the case of the upstream-side welding section S4 described above, this makes it possible to prevent the suspension of transport in the downstream-side welding section S5 from affecting the upstream sections and the downstream sections in the transport direction.

Incidentally, in the downstream-side welding section S5, an alignment mechanism that adjusts the positions of the upper head 50a and the lower head 50b in the transport direction is provided for each ultrasonic welding device 50. Each of the alignment mechanisms independently performs the following operations: measuring a displacement amount $\Delta Ta$ of the actual position of the first linear-welded portion J1 from a target formation position PMJ1 in the semi-finished product 1a (FIG. 11); adjusting the positions of the corresponding upper head 50a and lower head 50b in the transport direction by the displacement amount $\Delta Ta$; and aligning the formation position of the first linear-welded portion J1 with the target formation position PMJ1. This alignment mechanism will be described later.

Figure 6:
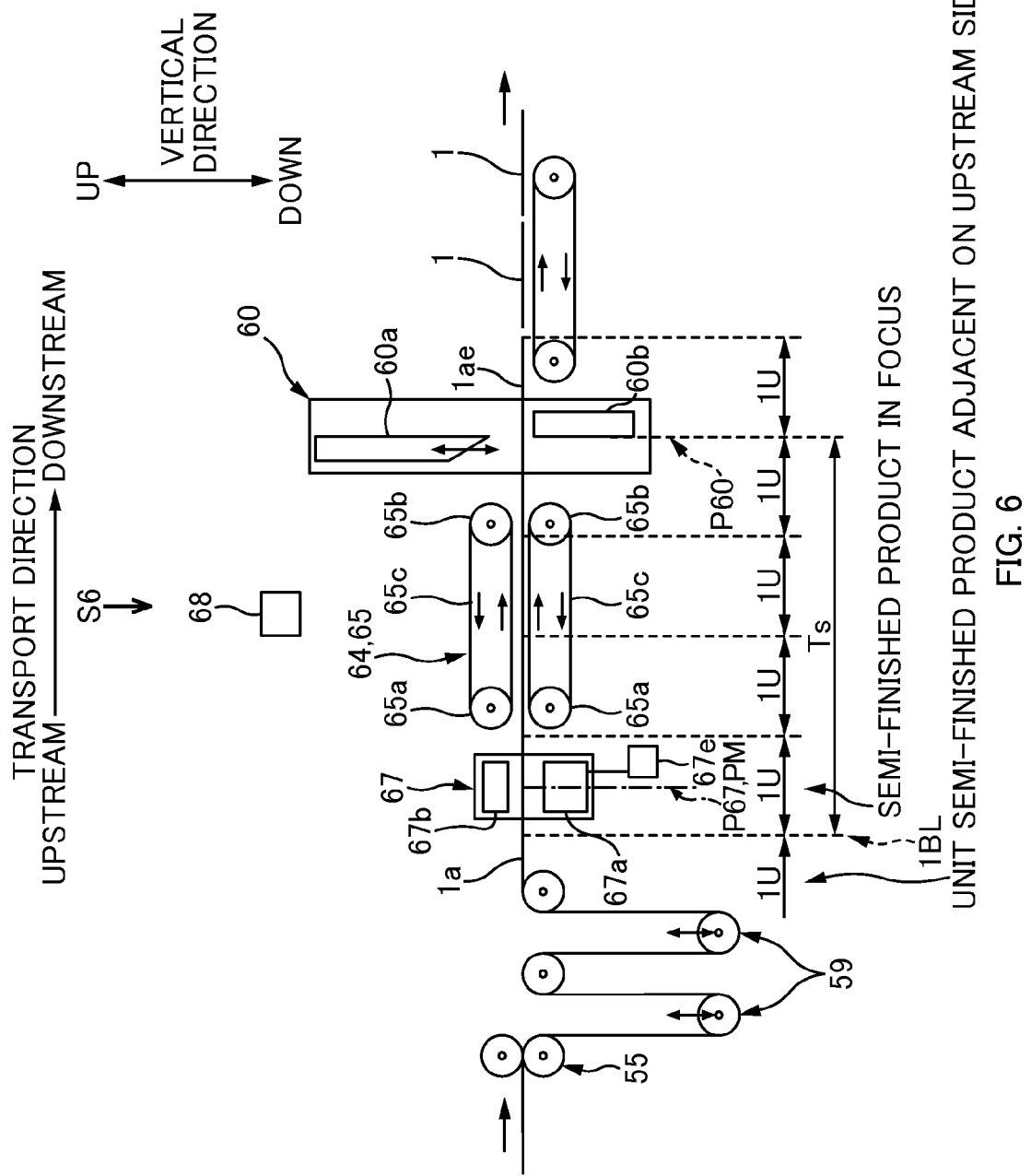
FIG. 6 is an enlarged schematic side view of the separation section S6.

Thereafter, as shown in FIG. 3, the semi-finished product 1a (corresponding to the "continuous web member") finally passes through the separation section S6. FIG. 6 shows an enlarged schematic side view of the separation section S6. In the separation section S6, the cutter mechanism 60 is disposed. When the semi-finished product 1a passes through the mechanism 60, the downstream end portion 1ae thereof is cut and separated, which results in the cleaning web member 1.

The cutter mechanism 60 performs shearing. Specifically, the cutter mechanism 60 includes: an upper blade 60a which is located above the transport path for the semi-finished product 1a and moves up and down; and a lower blade 60b which is located below the transport path and is secured immovably. When the upper blade 60a falling toward the lower blade 60b crosses the lower blade 60b with a minute gap therebetween, a shearing force is applied to the semi-finished product 1a, which results in cutting the semi-finished product 1a. In other words, the semi-finished product 1a is cut at a cut position P60 that is the position of the minute gap between the upper blade 60a and the lower blade 60b. Shearing can effectively prevent formation of a bound portion due to fusion at a cut edge of the semi-finished product 1a.

Since the shearing mentioned above is performed, cutting of the semi-finished product 1a is performed while the semi-finished product 1a is transported intermittently. That is, at the position of the cutter mechanism 60, disposed is an intermittent transport device 64 for intermittently transporting the semi-finished product 1a. The transport is suspended every time when the semi-finished product 1a is transported by a distance approximately corresponding to one unit semi-finished product 1U. During this transport suspension, the semi-finished product 1a is cut at a boundary position 1BL (FIG. 4) between unit semi-finished products 1U adjacent to each other, and the downstream end portion 1ae of the semi-finished product 1a is separated. Then, the intermittent transport device 64 restarts the transport of the semi-finished product 1a by a distance approximately corresponding to one unit semi-finished product 1U. In this way, this processing is repeated, and thereby the cleaning web member 1 is separated and produced.

As shown in FIG. 6, the intermittent transport device 64 includes: a belt conveyor 65 (corresponding to the intermittent transport mechanism) that transports the semi-finished product 1a; a sensor 67 that measures a displacement amount $\Delta T$ of the stop position of the first linear-welded portion J1 from a target stop position PM in the semi-finished product 1a at the time of transport suspension, where a position P67 upstream from the belt conveyer 65 in the transport direction is a measurement position P67; and a control section 68 that controls a transport amount Tp of the intermittent transport by the belt conveyer 65 based on the displacement amount $\Delta T$ output from the sensor 67.

The belt conveyer 65 is a device in which a transport path for the semi-finished product 1a is formed between a pair of upper and lower endless belts 65c and 65c. More specifically, the upper endless belt 65c is wrapped around a pair of rollers 65a and 65b disposed at front and rear positions in the transport direction; the lower endless belt 65c is wrapped around a pair of rollers 65a and 65b disposed at front and rear positions in the transport direction. The upper and lower endless belts 65c and 65c are driven and move around the rollers in conjunction with each other while the semi-finished product 1a is sandwiched therebetween in the thickness direction. Thereby, the semi-finished product 1a is transported in the transport direction. The move-around operation of the endless belts 65c and 65c is achieved by the rotation of the rollers 65a and 65a driven by a servo motor (not shown) as a drive source, for example.

The control section 68 is an appropriate computer, a PLC, or the like, and has a processor and a memory. The processor reads a control program stored previously in the memory and executes the program, thereby controlling the operation of the servo motor as the drive source of the belt conveyors 65, and thus transporting intermittently a plurality of unit semi-finished products 1U, 1U, . . . lying between the measurement position P67 of the sensor 67 and the cut position P60 of the cutter mechanism 60. During this intermittent transport, the control section 68 suspends the transport for each unit semi-finished product 1U while aligning the boundary position 1BL between unit semi-finished products 1U and 1U (FIG. 4) with the cut position P60 of the cutter mechanism 60. In this way, the unit semi-finished product 1U is cut and separated accurately at its boundary position 1BL, which results in the cleaning web member 1 with high size precision.

The intermittent transport accompanied by the foregoing alignment is performed based on the displacement amount $\Delta T$ measured by the sensor 67 for each unit semi-finished product 1U. This is based on the following concept.

First, the intermittent transport is performed at the same time for all the unit semi-finished products 1U, 1U, . . . lying between the measurement position P67 of the sensor 67 and the cut position P60 of the cutter mechanism 60. Therefore, at the time of cutting of the unit semi-finished product 1U of the downstream end portion 1ae of the semi-finished product 1a, one unit semi-finished product 1U is located and stopped at the cut position P60 and another unit semi-finished product 1U is also located and stopped at the measurement position P67 of the sensor 67.

Assume that a unit semi-finished product 1U which is currently stopped at the measurement position P67 of the sensor 67 is accurately located at the target stop position PM predetermined on the transport path. In this case, the following transport amount is previously known by means such as an experiment and a geometrical relative position relationship between the target stop position PM and the cut position P60 of the cutter mechanism 60: that is, the transport amount necessary to transport this unit semi-finished product 1U so that the boundary position 1BL between this unit semi-finished product 1U and the adjacent unit semifinished product 1U on the upstream side is located at the cut position P60 of the cutter mechanism 60. As used herein, this theoretical transport amount is referred to as the "reference transport amount Ts," and the transport amount corresponding to one unit semi-finished product 1U is referred to as the "unit transport amount Tu."

Referring to FIG. 5, the description will be made in more detail. Assume that the target stop position PM at the measurement position P67 of the sensor 67 is set with respect to the first linear-welded portion J1 of the unit semi-finished product 1U, and that the transport path is designed so that the length of the transport path between the target stop position PM and the cut position P60 of the cutter mechanism 60 corresponds to just three and a half unit semi-finished products 1U, 1U, . . . . In this case, total four unit semi-finished products 1U including the unit semi-finished product 1U that is located at the measurement position P67 exists between the measurement position P67 and the cut position P60 of the cutter mechanism 60. Therefore, the necessary transport amount for the boundary position 1BL between the unit semi-finished product 1U in focus and the adjacent unit semi-finished product 1U on the upstream side to be accurately aligned with the cut position P60 of the cutter mechanism 60 will be as follows: if the unit semi-finished product 1U stops in the state where the first linear-welded portion J1 thereof is located precisely on the target stop position PM, the semi-finished products are transport by a transport amount corresponding to four unit semi-finished products 1U, that is, a transport amount four times as large as the unit transport amount Tu (=4×Tu). In other words, in this case, the reference transport amount Ts is a transport amount four times as large as the unit transport amount Tu (=4×Tu). Therefore, when the semi-finished product is transported by this reference transport amount Ts, the boundary position 1BL of the unit semi-finished product 1U in focus will be accurately aligned with the cut position P60 of the cutter mechanism 60.

Therefore, when the first linear-welded portion J1 of the unit semi-finished product 1U that stops on the measurement position P67 is displaced downstream from the target stop position PM by |ΔT|, the unit semi-finished product 1U is transported by a target transport amount Tm, which is a transport amount smaller than the reference transport amount Ts by |ΔT| (=Ts−|ΔT|). By this transport, when the unit semi-finished product 1U in focus arrives at the cutter mechanism 60, the boundary position 1BL between the unit semi-finished product 1U in focus and the adjacent unit semi-finished product 1U on the upstream side will be positioned, to coincide with the cut position P60 of the cutter mechanism 60. Conversely, when the first linear-welded portion J1 of the unit semi-finished product 1U that stops on the measurement position P67 is displaced upstream from the target stop position PM by |ΔT|, the unit semi-finished product 1U is transported by a the target transport amount Tm, which is a transport amount larger than the reference transport amount Ts by |ΔT| (=Ts+|ΔTΔ). By this transport, the boundary position 1BL between the unit semi-finished product 1U in focus and the adjacent unit semi-finished product 1U on the upstream side will be positioned, to coincide with the cut position P60 of the cutter mechanism 60.

However, for a period of time when a certain unit semi-finished product 1U that has stopped on the measurement position P67 restarts and arrives at the cut position P60 of the cutter mechanism 60, the unit semi-finished products 1U, 1U, . . . located downstream from the certain unit semi-finished product 1U are sequentially cut by the cutter mechanism 60, and, every time of such cutting, intermittent transport is performed. For example, when four unit semi-finished products 1U including the certain unit semi-finished product 1U exist as with the case described above, the intermittent transport is performed four times for a period of time when the certain unit semi-finished product 1U that has stopped on the measurement position P67 restarts and arrives at the cutter mechanism 60. That is, as a result of accumulating the transport amount Tp of each of four times of intermittent transport (hereinafter referred to as the "intermittent transport amount Tp"), the unit semi-finished product 1U at the measurement position P67 arrives at the cut position P60 of the cutter mechanism 60.

Only the last intermittent transport among the four times of intermittent transport is used for alignment of the unit semi-finished product 1U that has stopped on the measurement position P67. The reason for this is that the three intermittent transports except for the last one are used for alignment of the unit semi-finished products 1U which arrive at the cutter mechanism 60 prior to the unit semi-finished product 1U that has stopped on the measurement position P67. In other words, the alignment of each unit semi-finished product 1U with the cut position P60 is performed by adjusting the intermittent transport amount Tp related to its last intermittent transport. Therefore, the control section 68 computes the last intermittent transport amount Tp for each unit semi-finished product 1U in the manner described below, for example. By repeating intermittent transport by the computed last intermittent transport amount Tp, each unit semi-finished product 1U is aligned with the cut position P60.

First, during a suspension of transport, information of the displacement amount ΔT is transmitted from the sensor 67 to the control section 68. Then, the control section 68 subtracts the displacement amount ΔT from the reference transport amount Ts stored previously in the memory, and computes the target transport amount Tm (=Ts−ΔT). Then, the control section 68 stores the target transport amount Tm in the memory as a provisional transport amount Tt. The control section 68 also correlates an initial count value with the provisional transport amount Tt and stores the initial count value in the memory. The initial count value is the number of unit semi-finished products 1U that can exist between the measurement position P67 of the sensor 67 and the cut position P60 of the cutter mechanism 60, which is "four" in the above example.

Then, every time intermittent transport is performed, the actual value of the intermittent transport amount Tp is subtracted from the provisional transport amount Tt, and the resultant subtracted amount is stored as an updated provisional transport amount Tt in the memory. Simultaneously, the above count value decreases by one and is updated. When the count value becomes "1," the next intermittent transport is the last intermittent transport. The control section 68 controls the transport operation of the belt conveyer 65 using the value of the provisional transport amount Tt correlating to this count value as the instruction value of the intermittent transport amount Tp of the next intermittent transport. Thereby, at the time of this intermittent transport, the boundary position 1BL between the unit semi-finished product 1U and the adjacent unit semi-finished product 1U on the upstream side is aligned with the cut position P60 of the cutter mechanism 60. Note that the actual value of the intermittent transport amount Tp of the belt conveyer 65 is measured by an rotary encoder (not shown) coupled to the roller 65a, for example, and information on the actual value is transmitted to the control section 68.

Alternatively, in some cases, without the foregoing reference transport amount Ts, the instruction value of the intermittent transport amount Tp may be computed using only the unit transport amount Tu and the displacement amount ΔT. In other words, the instruction value of the intermittent transport amount Tp may be computed by correcting the unit transport amount Tu using the displacement amount ΔT. However, in this case, it is also necessary to correlate the instruction value of the intermittent transport amount Tp with the unit semi-finished product 1U because the instruction value of the intermittent transport amount Tp computed by correcting the unit transport amount Tu using the displacement amount ΔT is correlated to the fourth intermittent transport after the time point of measurement of the displacement amount ΔT. This will be described in detail below.

First, during a suspension of transport, information of the displacement amount ΔT is transmitted from the sensor 67 to the control section 68. Then, the control section 68 subtracts the displacement amount ΔT from the unit transport amount Tu stored previously in the memory, and computes a corrected transport amount Tma (=Tu−ΔT). Then, the control section 68 stores the corrected transport amount Tma in the memory. The control section 68 also correlates an initial count value with the corrected transport amount Tma and stores the initial count value in the memory. The initial count value is the number of unit semi-finished products 1U that can exist between the measurement position P67 of the sensor 67 and the cut position P60 of the cutter mechanism 60, which is "four" in this example.

Then, every time intermittent transport is performed, the above count value decreases by one, and is updated in the memory. When the count value becomes "1," the next intermittent transport is the last intermittent transport. The control section 68 controls the transport operation of the belt conveyer 65 using the value of the corrected transport amount Tma correlating to this count value as the instruction value of the intermittent transport amount Tp of the next intermittent transport. Thereby, at the time of this intermittent transport, the boundary position 1BL between the unit semi-finished product 1U and the adjacent unit semi-finished product 1U on the upstream side is aligned with the cut position P60 of the cutter mechanism 60.

The sensor 67 that measures the displacement amount ΔT during suspension of transport will be described in detail below.

As shown in FIG. 6, the sensor 67 includes, for example: a camera 67a as an imaging section that is disposed at a predetermined position between the belt conveyer 65 of the intermittent transport device 64 and the dancer roller 59 located upstream from the belt conveyer 65; an illumination member 67b that is disposed at a position at which the portion of the transport path for the semi-finished product 1a is sandwiched between the illumination member 67b and the camera 67a; and an image processing section 67c.

The camera 67a is a charge coupled device (CCD), for example. The camera 67a is disposed facing the bottom surface (corresponding to the one surface) of the semi-finished product 1a. Therefore, the camera 67a images the bottom surface of the semi-finished product 1a which is passing through the imaging position that is the measurement position P67. Then, the camera 67a generates the data of a planar image. This imaging operation is performed every time when the transport of the semi-finished product 1a is suspended by the intermittent transport device 64. The camera 67a is aligned and secured immovably in advance so that the target stop position PM of the first linear-welded portion J1 is located at the center position CP of the planar image (see FIG. 7). The camera 67a performs imaging at every time of suspension, that is, the camera images every unit semi-finished product 1U. Every time when the camera 67a performs imaging, a data of the planar image which the camera has imaged is generated as a planar image data. Every time when the generation takes place, the planar image data is transmitted to the image processing section 67c. Then, the image processing section 67c computes the displacement amount ΔT (FIG. 7) of the stop position of the first linear-welded portion J1 of the unit semi-finished product 1U from the target stop position PM based on the planar image data, and transmits the information of the displacement amount ΔT to the control section 68. The control section 68 uses the displacement amount ΔT for the computation of the intermittent transport amount Tp as described above.

The illumination member 67b is an appropriate light such as a white LED light, a fluorescent lamp, or the like. Type of the light source is appropriately selected depending on the imaging condition of the place. As already described, the illumination member 67b is disposed at a position where the semi-finished product 1a is sandwiched between the camera 67a and the illumination member 67b in the thickness direction, that is, on the upper-surface side of the semi-finished product 1a. Thus, the camera 67a performs imaging by receiving transmitted light which has been transmitted through the semi-finished product 1a in the thickness direction.

The image processing section 67c has an appropriate computer as a main body, and has a processor and a memory. The processor reads and executes various programs stored previously in the memory, and thereby various processings are executed.

Specifically, in this embodiment, the following programs are stored previously in the memory: a binarization program which generates from the planar image data a binarized image used for computation of the displacement amount; and a displacement-amount computation program which computes based on the binarized image the displacement amount ΔT of the stop position of the first linear-welded portion J1 of the unit semi-finished product 1U from the target stop position PM.

The processor reads and executes the above programs appropriately. Therefore, the image processing section 67c serves as the following sections: a binarization section that generates a binarized image for computation of the displacement amount from the planar image data; and a displacement-amount computation section that computes based on the binarized image the displacement amount ΔT of the stop position of the first linear-welded portion J1 of the unit semi-finished product 1U from the target stop position PM. The binarization processing and the displacement-amount computation processing will be described below.

First, before describing the binarization processing, the planar image and the planar image data will be described with reference to FIG. 7.

Figure 7:
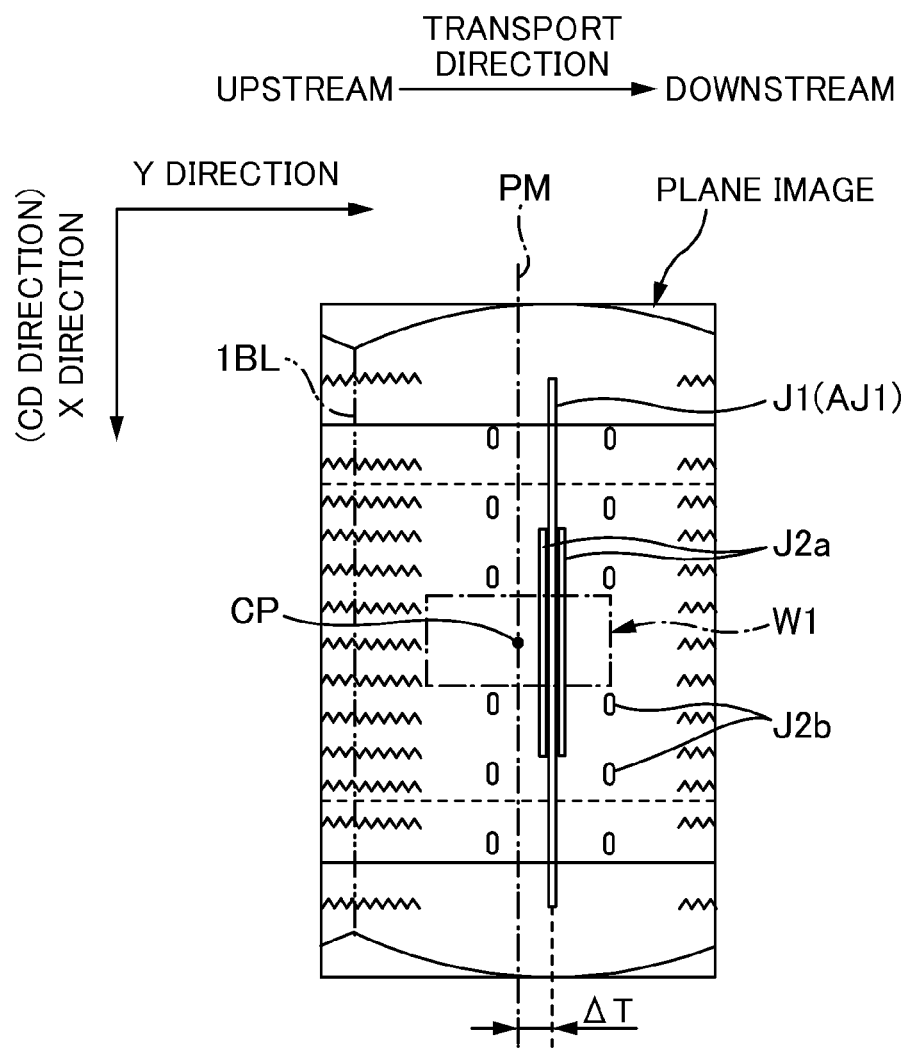
FIG. 7 is a conceptual diagram of a planar image according to the embodiment, which is for use in computation of a displacement amount ΔT and is imaged by a camera 67a of a sensor 67 in the separation section S6.

FIG. 7 is a conceptual diagram of the planar image. In FIG. 7, for the purpose of easy understanding of the planar size, etc. of the planar image, the boundary position 1BL between unit semi-finished products 1U is indicated by a virtual double-dotted chain line. However, such a line does not exist on the actual semi-finished product 1a.

When a planar image is imaged, the X direction is the CD direction and the Y direction is the transport direction, for example. Regarding the Y direction, the position of the area in which the target stop position PM for the first linear-welded portion J1 is imaged, i.e., the center position CP of the planar image is set as point zero of the Y coordinate. From point zero, positive coordinate values are given in the direction corresponding to the transport downstream direction, and negative coordinate values are given in the direction corresponding to the transport upstream direction. Further, in the planar image, the substantially entire unit semi-finished product 1U is imaged as one image.

The foregoing planar image is a set of multiple pixels which are placed in a grid pattern at predetermined pitches in each of the X and Y directions; the predetermined pitches in each of the X and Y directions are set based on respective predetermined resolutions. In other words, the planar image consists of a plurality of pixel lines lined up in the Y direction at a predetermined pitch, the pixel line being composed of a plurality of pixels lined up straight in the X direction at a predetermined pitch. The planar image data has color information corresponding to each pixel. For example, if the planar image is a grayscale image, the planar image data has only the brightness of each pixel as color information. In this case, since pixels in the unit semi-finished product 1U corresponding to a region with high transparency become light, the pixels have high brightness. On the other hand, since pixels corresponding to a region with low transparency become dark, the pixels have low brightness.

Here, the first linear-welded portion J1 is a portion subjected to the welding through all the layers thereof in the thickness direction. Therefore, the first linear-welded portion J1 is smaller in thickness and higher in transparency than, not only any portion of the semi-finished product 1a that has not been welded, but also the second linear-welded portions J2a and the islandlike-welded portions J2b. Thus, the transparency of the first linear-welded portion J1 is higher than that of the other portions. For this reason, paying attention to pixels having a brightness equal to or higher than a certain value makes it possible to identify on the planar image of FIG. 7 the pixels representing an area AJ1 on which the first linear-welded portion J1 is imaged. Note that, in the following description, the planar image data is assumed to be a grayscale data.

In the binarization processing, in order to reduce computation load of the image processing section 67c, areas within a planar image that are to be subjected to the binarization processing are limited. Specifically, in the binarization processing, as shown in FIG. 7, an inspection window W1 is defined so as to include at least the imaged area AJ1 of the first linear-welded portion J1 and the position of point zero of the Y coordinate as the target stop position PM; thereby, only an area within the planar image surrounded by the inspection window W1 is subjected to the binarization processing.

The foregoing referring only of the pixels within the inspection window W1 is achieved in the following manner, for example. First, each of pixels of the planar image has X and Y coordinates, which are stored in the memory. By specifying the X and Y coordinates, the image processing section 67c can access the color information of the pixel within the inspection window W1. Therefore, data of the X and Y coordinates of the pixels that are to be within the inspection window W1 are previously stored in the memory, which results in achieving referring only of the pixels within the foregoing inspection window W1.

In the binarization processing, a predetermined first binarization threshold is used. The first binarization threshold is set to a value between the brightness of pixels corresponding to the first linear-welded portion J1 and the brightness of pixels corresponding to the second linear-welded portions J2a. The first binarization threshold is stored previously in the memory.

Figure 8:
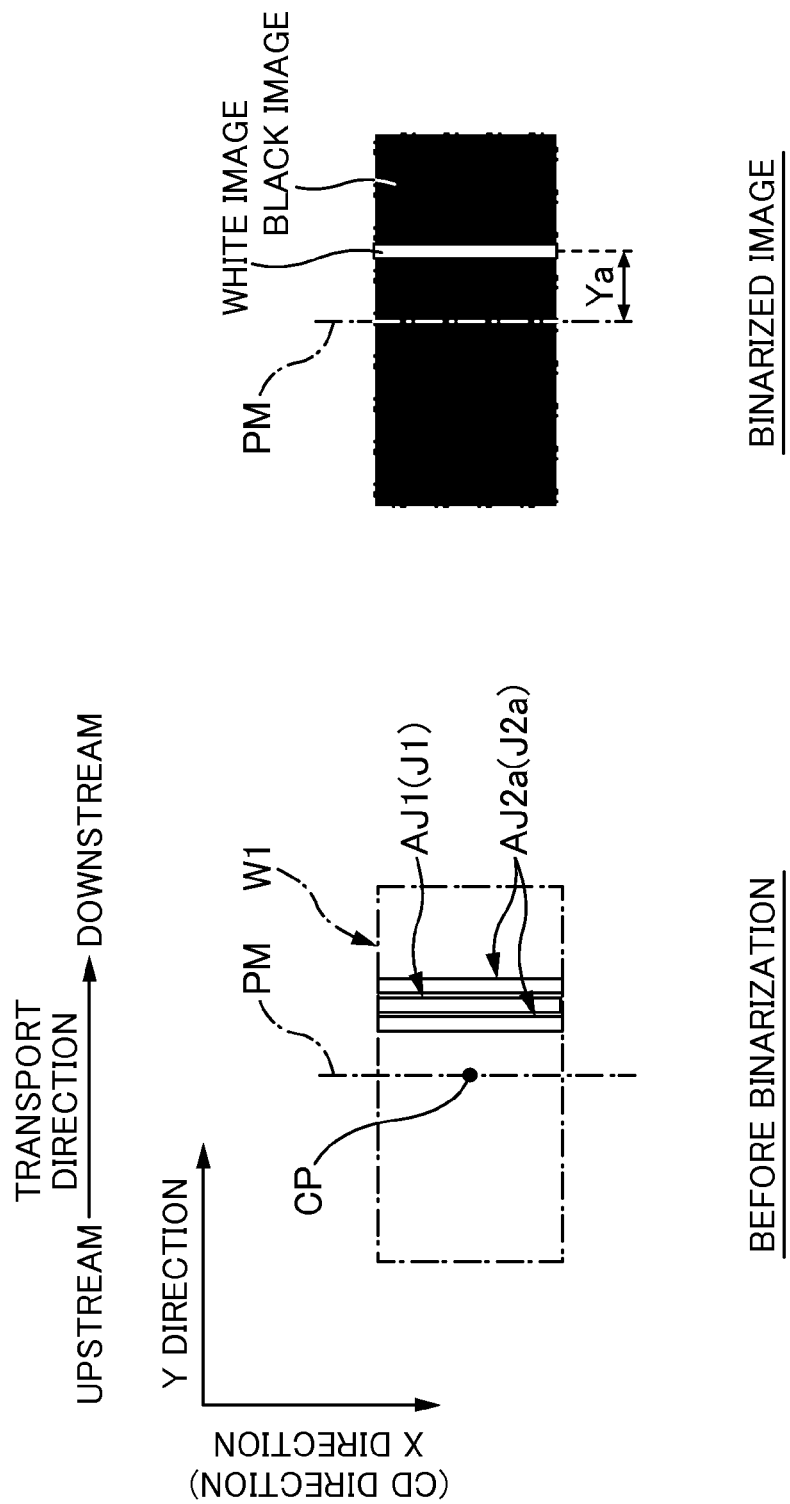
FIG. 8A shows a planar image in an inspection window W1 before a binarization processing.
FIG. 8B shows a binarized image generated by performing a binarization processing of this planar image.

Of pixels within the inspection window W1 in FIG. 8A (FIG. 7), a pixel having a brightness equal to or greater than the first binarization threshold is assigned to a white image; the white image is defined by the value "1" which is one of the two values (e.g., 0 and 1) of a binarized image in FIG. 8B. On the other hand, a pixel having a brightness less than the first binarization threshold is assigned to a black image; the black image is defined by the other value "0." Every pixel within the inspection window W1 undergoes this operation. Therefore, of pixels within the inspection window W1 as shown in FIG. 8A, the imaged area AJ1 of the first linear-welded portion J1 undergoes the binarization processing so as to be included in the white image of the binarized image, as shown in FIG. 8B; on the other hand, the other areas (e.g., imaged areas AJ2a of the second linear-welded portions J2a and areas in which no weld portions are imaged) undergo the binarization processing so as to be included in the black image. That is, as a result of the binarization processing of the planar image data using the inspection window W1 shown in FIG. 8A (FIG. 7), the binarized image in FIG. 8B is generated.

Thereafter, the image processing section 67c shifts to the displacement-amount computation processing. In this example, as described earlier, the target stop position PM for the first linear-welded portion J1 is imaged so as to be located at point zero of the Y coordinate in the planar image, which is the center position CP in the Y direction. Therefore, the average value Ya of the Y coordinate values of the pixels assigned to the white image indicates indirectly the displacement amount ΔT. Also, in order to convert the Y coordinate values to the displacement amounts ΔT, correspondence data between the Y coordinate values and the actual-size converted values (displacement amounts ΔT) in the transport direction is stored in the memory. Therefore, the image processing section 67c acquires from such correspondence data the displacement amount ΔT corresponding to the average value Ya of the Y coordinate values of the extracted pixels, and transmits the acquired value to the control section 68. Then, the control section 68 uses this displacement amount ΔT for computation of the intermittent transport amount Tp. This computation has already been described and thus omitted here. The displacement-amount computation processing described above is a mere example, and the invention is not limited to this. For example, the target stop position PM does not have to coincide with point zero of the Y coordinate. In this case, in order to acquire the value in the Y coordinate system corresponding to the displacement amount ΔT, it is sufficient to subtract the Y coordinate value of the target stop position PM stored previously in the memory from the average value Ya.

By the way, in this embodiment, in computation of the displacement amount ΔT of the stop position of the unit semi-finished product 1U from the target stop position PM, the first linear-welded portion J1 is used as the representative of the entire region of the unit semi-finished product 1U, and the displacement amount ΔT of the first linear-welded portion J1 is computed. The reason for this is as follows.

On one hand, the cleaning web member 1 will be easy to use if the handle member 9 is accurately attached to the center position of the cleaning web member 1. In the attachment of the handle member 9, involved is the first linear-welded portion J1. Therefore, from the standpoint of article design, the cleaning web member 1 is designed so that the first linear-welded portion J1 lies at the center position thereof. On the other hand, in order to ensure that the handle member 9 finally lies at the center position of the cleaning web member 1, it is necessary to enhance the precision of the cut position at the time of cutting the semi-finished product 1a into the cleaning web member 1. At this time of cutting, concerning the first linear-welded portion J1 which is to be the center position of the cleaning web member 1, it is considered that performing the cutting while accurately aligning the first linear-welded portion J1 with the cutter mechanism 60 will make it easy to maintain the first linear-welded portion J1 at the center position in the resultantly-produced cleaning web member 1, which results in placing the handle member 9 at the center position without fail. For this reason, in this embodiment, the first linear-welded portion J1 is used as the representative region for the alignment. In other words, from the standpoint of improvement of the size precision of the finally-produced cleaning web member 1, the first linear-welded portion J1 is used as the representative region of the unit semi-finished product 1U.

However, the representative region described above may be any region other than the first linear-welded portion J1 as far as the size precision can be improved. For example, it may be the trough 2eev (corresponding to the "predetermined region") of each of the edges 2ee of the base sheet 2a in the CD direction. That is, the trough 2eev is located at the boundary position 1BL between unit semi-finished products 1U adjacent to each other in the transport direction, and corresponds to the target cut position that is the position to be cut on the semi-finished product 1a. Therefore, it is acceptable to compute the intermittent transport amount Tp based on the displacement amount ΔT of the stop position of the trough 2eev from a target stop position PMv. This is because this enables the trough 2eev to be positioned so as to coincide with the cut position P60 of the cutter mechanism 60, which improves the precision of the cut position on the semi-finished product 1a. This will be described hereinafter as the modified example of this embodiment, in which though only the difference from the above embodiment will be described.

Figure 9:
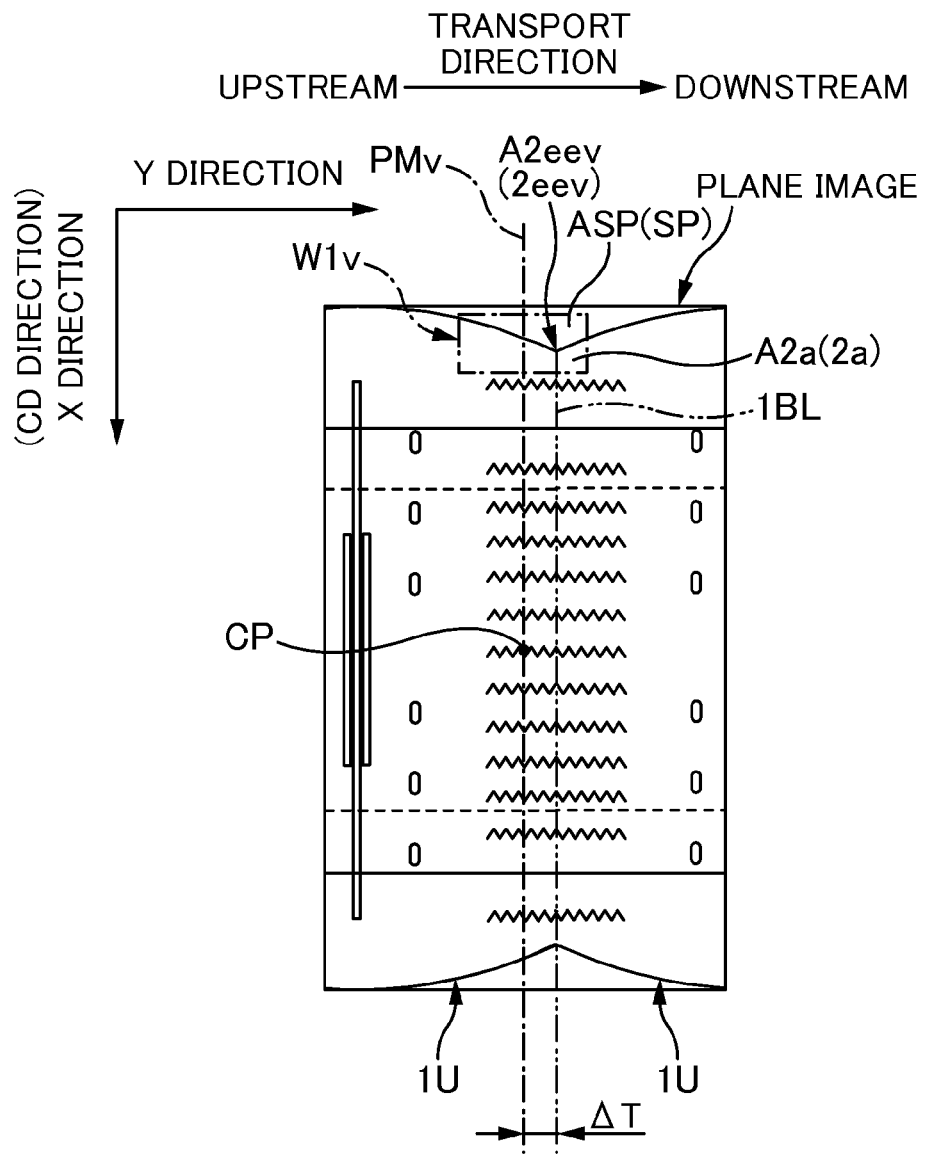
FIG. 9 is a conceptual diagram of a planar image in the modified example.

FIG. 9 is a conceptual diagram of a planar image taken. In this modified example, the trough 2eev of each of the edges 2ee of the base sheet 2a is a region for computation of the displacement amount ΔT. Therefore, as shown in FIG. 9, imaged is a region across the boundary between the unit semi-finished product 1U for which the displacement amount ΔT is to be computed and the adjacent unit semi-finished product 1U on the upstream side. Thus, the planar image thereof is an image having approximate halves of the two unit semi-finished products 1U. Also, the center position in the Y direction is imaged so as to be located at the target stop position PMv for the trough 2eev in the planar image; the center position is set to point zero of the Y coordinate. From point zero, positive coordinate values are given in the direction corresponding to the transport downstream direction, and negative coordinate values are given in the direction corresponding to the transport upstream direction.

First, the image processing section 67c performs binarization processing for the planar image data. In this binarization processing, also, an inspection window W1v is set as shown in FIG. 9. This setting is made to include, within the inspection window W1v, at least an imaged area A2eev of the trough 2eev and the position of point zero of the Y coordinate that is the target stop position PMv for the trough 2eev.

Figures 10A, 10B:
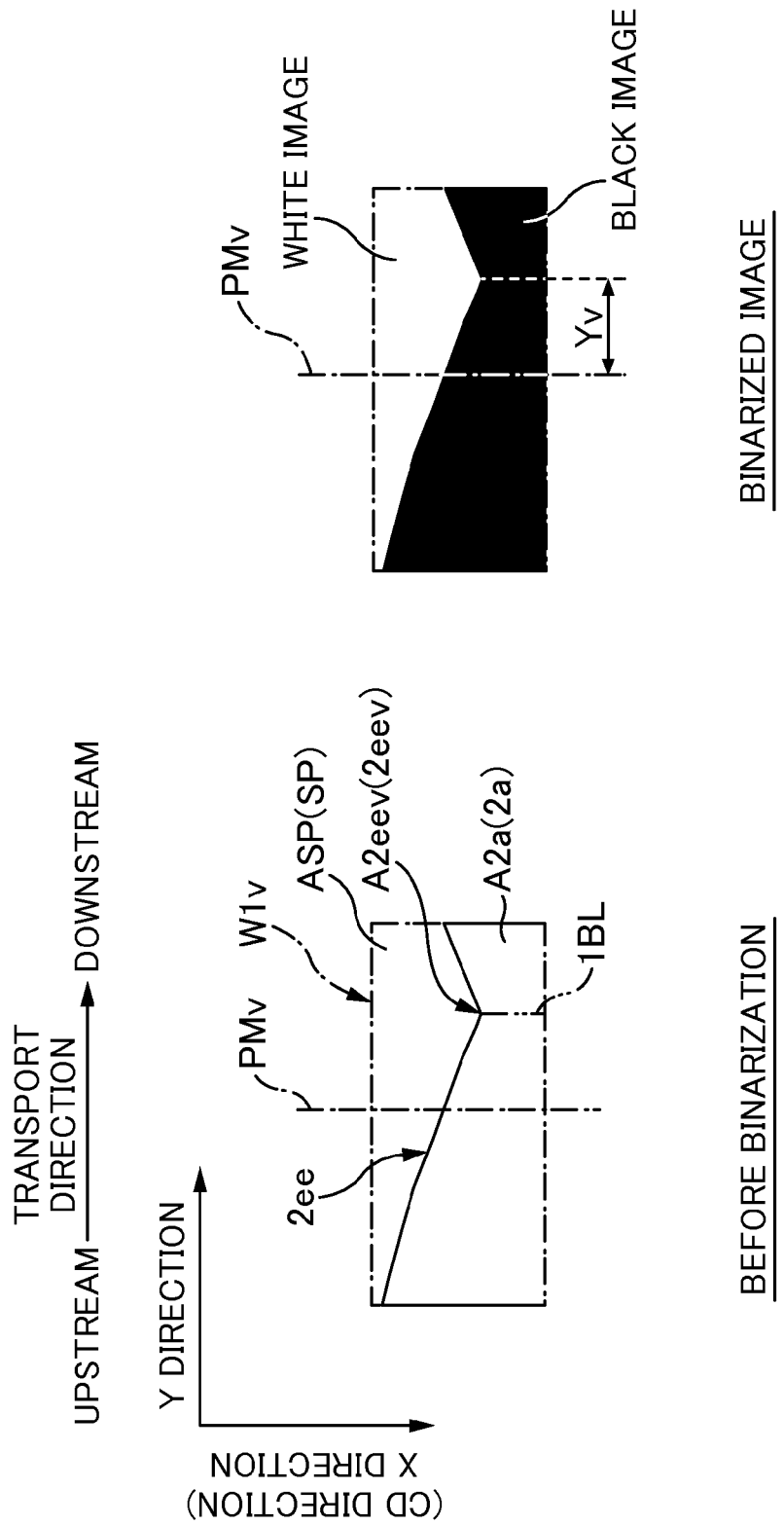
FIG. 10A shows a planar image in an inspection window W1v before a binarization processing.
FIG. 10B shows a binarized image generated by performing a binarization processing of the planar image.

The area within the inspection window W1v undergoes the binarization processing using a predetermined first binarization threshold. More specifically, the first binarization threshold is set to a value between the brightness of pixels corresponding to the base sheet 2a and the brightness of pixels corresponding to space the SP nearer to the end in the CD direction than the base sheet 2a. Of the pixels within the inspection window W1v in FIG. 10A, a pixel having a brightness equal to or greater than the first binarization threshold is assigned to a white image; the white image is defined by the value "1" which is one of the two values (e.g., 0 and 1) of a binarized image in FIG. 10B. On the other hand, a pixel having a brightness less than the first binarization threshold is assigned to a black image; the black image is defined by the other value "0." Every pixel within the inspection window W1v in FIG. 10A undergoes this operation. Therefore, of pixels within the inspection window W1v as shown in FIG. 10A, an imaged area A2a of the base sheet 2a undergoes the binarization processing so as to be included in the black image of the binarized image, as shown in FIG. 10B; on the other hand, the other areas (an imaged area ASP of the space SP nearer to the end in the CD direction than the base sheet 2a) undergoes the binarization processing so as to be included in the wthie image. That is, as a result of the binarization processing of the planar image data using the inspection window W1v shown in FIG. 10A (FIG. 9), the binarized image in FIG. 10B is generated.

Thereafter, the image processing section 67c shifts to the displacement-amount computation processing. As described above, the target stop position PMv for the trough 2eev is imaged so as to be located at point zero of the Y coordinate in the planar image, which is the center position in the Y direction. The imaged area A2eev of the trough 2eev is included in the black image, and the Y coordinate value Yv of the pixel corresponding to the trough 2eev, which is the imaged area A2eev, is equal to the Y coordinate value of the pixel having the largest X coordinate value in the white image, which is adjacent to the black image in the X direction. Therefore, this Y coordinate value indicates indirectly the displacement amount ΔT of the stop position of the trough 2eev from the target stop position PMv. Also, correspondence data between the Y coordinate values and the actual-size converted values (displacement amounts ΔT) in the transport direction is stored in the memory. Therefore, the image processing section 67c acquires from such correspondence data the displacement amount ΔT corresponding to the Y coordinate value Yv of the pixel having the largest X coordinate value in the white image, and transmits the acquired value to the control section 68. Then, the control section 68 uses this displacement amount ΔT for computation of the intermittent transport amount Tp. The displacement-amount computation processing described above is a mere example, and the invention is not limited to this. For example, the target stop position PMv does not have to coincide with point zero of the Y coordinate. In this case, in order to acquire the value in the Y coordinate system corresponding to the displacement amount ΔT, it is sufficient to subtract the Y coordinate value of the target stop position PMv stored previously in the memory from the Y coordinate value of the pixel corresponding to the trough 2eev.

By the way, as described earlier, the alignment mechanism that adjusts the positions of the upper head 50a and the lower head 50b in the transport direction is provided for each ultrasonic welding device 50 in the downstream-side welding section S5 in FIG. 5. This will be described hereinafter. Note that only one of the alignment mechanisms will be described below because the alignment mechanisms are provided for each of the three ultrasonic welding devices 50, 50 and 50 lined in the transport direction and the mechanisms have the same in configuration.

As shown in FIG. 5, the alignment mechanism includes: a movement mechanism 52 that moves the upper head 50a and the lower head 50b in the transport direction; a second sensor 53 that determines the displacement amount ΔTa of the formation position of the first linear-welded portion J1 in the semi-finished product 1a from the target formation position PMJ1 (FIG. 11); and a second control section (not shown) that controls the movement mechanism 52 based on the information of the displacement amount ΔTa transmitted from the second sensor 53.

Every time when the transport of the semi-finished product 1a is stopped, the second sensor 53 measures the displacement amount ΔTa of the formation position of the first linear-welded portion J1 in the semi-finished product 1a from the target formation position PMJ1; then, the second sensor 53 transmits to the second control section information of the displacement amount ΔTa. Every time when the second control section is received this information, the second control section controls the movement mechanism 52 to move the upper head 50a and the lower head 50b in a direction in which the displacement amount ΔTa decreases.

For example, the second sensor 53 has a configuration as follows: when the first linear-welded portion J1 lies on the downstream side from the target formation position PMJ1 in the transport direction (see FIG. 11), the displacement amount ΔTa is measured as a positive value; and when the portion J1 lies on the upstream side therefrom, the displacement amount ΔTa is measured as a negative value. Therefore, when the displacement amount ΔTa is a positive value, the upper head 50a and the lower head 50b are moved upstream in the transport direction from the present position by the absolute value of the positive value. Conversely, when the displacement amount ΔTa is a negative value, the upper head 50a and the lower head 50b are moved downstream in the transport direction from the present position by the absolute value of the negative value. In this way, the first linear-welded portion J1 formed by the upper head 50a and the lower head 50b will be formed substantially at the target formation position PMJ1.

The target formation position PMJ1 is determined with reference to the pair of second linear-welded portions J2a and J2a or with reference to the plurality of islandlike-welded portions J2b, J2b, . . . , both of which are formed in the upstream-side welding section S4 described above. In this example, the target formation position PMJ1 is determined to a position from the plurality of islandlike-welded portions J2b, J2b, . . . in the transport direction at a distance of substantially the width (i.e., a value equal to or larger than the width by a defined value) of each insertion portion 9a of the handle member 9. The target formation position PMJ1 is the same as the intermediate position between the pair of second linear-welded portions J2a and J2a. Also, the target formation position PMJ1 is the same as the center position of the cleaning web member 1, which is the center position of the unit semi-finished product 1U in the transport direction.

Therefore, when the first linear-welded portion J1 is formed accurately at the target formation position PMJ1, the first linear-welded portion J1 together with the second linear-welded portions J2a and J2a and the islandlike-welded portions J2b, J2b, . . . partition the hollows SP3 and SP3 between the base sheet 2 (2a) and the auxiliary sheet 3 (3a), as shown in FIG. 2A; the hollows SP3 and SP3 are for insertion of the pair of insertion portions 9a of the handle member 9 and have a size suitable for the insertion. Since the handle member 9 inserted into and secured to the hollows SP3 will be located at the center position of the cleaning web member 1, the cleaning web member 1 will be easy to use.

Referring to FIG. 5, the movement mechanism 52, the second control section, and the second sensor 53 of the alignment mechanism will be described hereinafter.

The movement mechanism 52 includes: a guide member, like a linear guide, that guides the upper head 50a and the lower head 50b to allow the heads to reciprocate linearly in the transport direction; a servo motor as the drive source; and a motion-conversion mechanism, like a feed screw mechanism, that converts a rotational motion of a driving rotary shaft of the servo motor into a linear motion in the transport direction and transfers it to the upper head 50a and the lower head 50b to move the heads 50a and 50b.

The linear guide as an example of the guide member includes: a rail member; and a slider capable of reciprocating in the transport direction in engagement with the rail member. The upper head 50a and the lower head 50b are secured to and supported by the slider. However, any member other than the linear guide may be used if the member can guide the upper head 50a and the lower head 50b so that the heads can reciprocate linearly in the transport direction. Also, the motion-conversion mechanism is not limited to the feed screw mechanism, and a cam mechanism may be used.

The second control section is a computer or a PLC, for example, and has a processor and a memory. The processor reads a control program stored previously in the memory and executes the program, thereby controlling the servo motor of the movement mechanism 52, and thus moving the upper head 50a and the lower head 50b in the transport direction.

The second sensor 53 includes, for example: a camera 53a as a second imaging section that is disposed at a predetermined position (corresponding to a second measurement position) between the ultrasonic welding device 50 and the dancer roller 59 located downstream from the ultrasonic welding device 50; an illumination member 53b that is disposed at a position at which the portion of the transport path for the semi-finished product 1a is sandwiched between the illumination member 53b and the camera 53a; and a second image processing section 53c.

The camera 53a is a CCD, for example. The camera 53a is disposed facing the bottom surface (corresponding to the one surface) of the semi-finished product 1a. Therefore, the camera 53a images the bottom surface of the semi-finished product 1a which is passing through the predetermined position. Then, the camera 53a generates the data of a planar image. This imaging operation is performed every time when the transport of the semi-finished product 1a is suspended by the transport rollers 55 and 55 of the intermittent transport device. The camera 53a is set to a fixed position at which substantially the entire unit semi-finished product 1U for which the displacement amount ΔTa is to be measured is imaged as one image. The camera 53a performs imaging at every time of suspension. Every time the camera 53a performs imaging, a data of the planar image (FIG. 11) which the camera has imaged is generated as a planar image data. Every time when the generation takes place, the planar image data is transmitted to the second image processing section 53c. Then, the second image processing section 53c computes the displacement amount ΔTa of the first linear-welded portion J1 of the unit semi-finished product 1U from the target formation position PMJ1 based on the planar image data, and transmits the information of the displacement amount ΔTa to the second control section. The second control section uses the displacement amount ΔTa for the alignment of the upper head 50*a* and the lower head 50*b* in the transport direction as described above.

The illumination member 53*b* is an appropriate light source such as a white LED, a fluorescent lamp, or the like. Type of the light source is appropriately selected depending on the imaging condition of the place. As already described, the illumination member 53*b* is disposed at a position where the semi-finished product 1*a* is sandwiched between the camera 53*a* and the illumination member 53*b* in the thickness direction, that is, on the upper-surface side of the semi-finished product 1*a*. Thus, the camera 53*a* performs imaging by receiving transmitted light which has been transmitted through the semi-finished product 1*a* in the thickness direction.

The second image processing section 53*c* has an appropriate computer as its main body, and has a processor and a memory. The processor reads and executes various programs stored previously in the memory, and thereby various processings are executed.

In this embodiment, the following programs are stored previously in the memory: a second binarization program which generates from the planar image data a binarized image used for computation of the displacement amount; and a second displacement-amount computation program which computes based on the binarized image the displacement amount ΔTa of the first linear-welded portion J1 of the unit semi-finished product 1U from the target formation position PMJ1.

The processor reads and executes the above programs appropriately. Therefore, the second image processing section 53*c* serves as the following sections: a second binarization section that generates a binarized image for computation of the displacement amount from the planar image data; and a second displacement-amount computation section that computes based on the binarized image the displacement amount ΔTa of the first linear-welded portion J1 of the unit semi-finished product 1U from the target formation position PMJ1. The second binarization processing and the second displacement-amount computation processing will be described below.

First, the second image processing section 53*c* performs the second binarization processing for the planar image data, and computes a distance L between the first linear-welded portion J1 and any islandlike-welded portion J2*b* in the transport direction.

Figure 11:
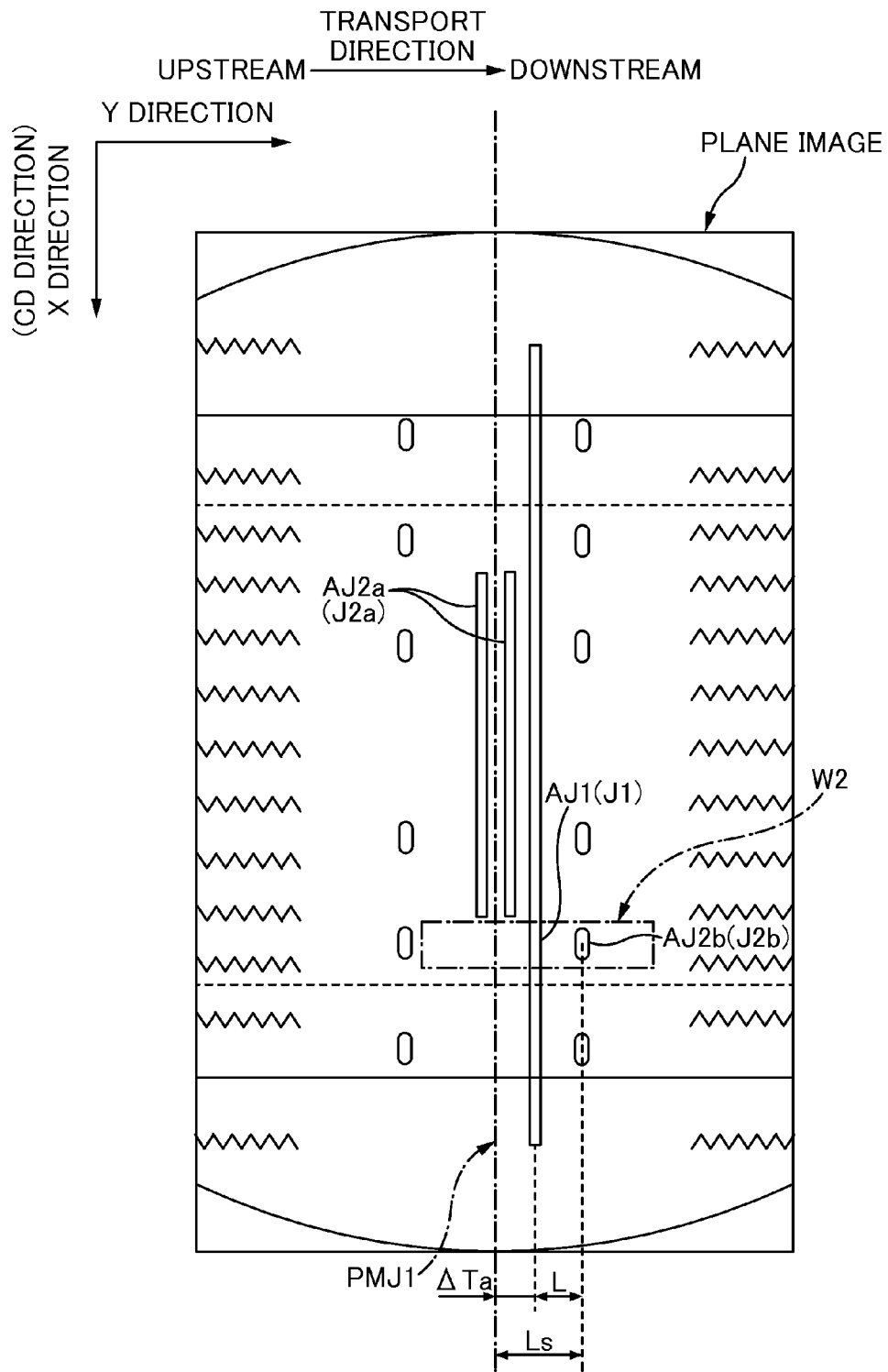
FIG. 11 is a conceptual diagram of a planar image which is for use in computation of a displacement amount ΔTa and is imaged by a camera 53a of a second sensor 53 in the downstream-side welding section S5.

FIG. 11 shows a conceptual diagram of a planar image. In the second binarization processing, a inspection window W2 is also used. The inspection window W2 is defined so as to have a planar size including a part of the imaged area AJ1 of the first linear-welded portion J1 and an imaged area AJ2*b* of an islandlike-welded portion J2*b*. The inspection window W2 is set at a position in the planar image where the inspection window W2 does not include any of the imaged areas AJ2*a* of the second linear-welded portions J2*a*. The reason that any of the imaged areas AJ2*a* of the second linear-welded portions J2*a* should not be included is that the imaged area AJ2*a* of the second linear-welded portions J2*a* tends to cause an error when the formation position of the first linear-welded portion J1 is specified.

Also, in the second binarization processing, a predetermined second binarization threshold is used. The second binarization threshold is set to a value between the brightness of pixels corresponding to the islandlike-welded portion J2*b* and the brightness of pixels corresponding to a portion in which no weld portion is formed (i.e., a portion in which neither the first linear-welded portion J1 nor the islandlike-welded portions J2*b* is formed). The second binarization threshold is stored previously in the memory.

Of the pixels within the inspection window W2 in FIG. 12A (FIG. 11), a pixel having a brightness equal to or greater than the second binarization threshold is assigned to a white image; the white image is defined by the value "1" which is one of the two values (e.g., 0 and 1) of a binarized image in FIG. 12B. On the other hand, a pixel having a brightness less than the second binarization threshold is assigned to a black image; the black image is defined by the other value "0." Every pixel within the inspection window W2 in FIG. 12A undergoes this operation. Therefore, of the pixels within the inspection window W2 as shown in FIG. 12A, the imaged area AJ1 of the first linear-welded portion J1 and the imaged area AJ2*b* of the islandlike-welded portion J2*b* undergo the binarization processing so as to be included in the white image of the binarized image, as shown in FIG. 12B; on the other hand, the other areas undergo the binarization processing so as to be included in the black image. That is, as a result of the binarization processing of the planar image data using the inspection window W2 shown in FIG. 12A (FIG. 11), the binarized image in FIG. 12B is generated.

Thereafter, the second image processing section 53*c* shifts to the second displacement-amount computation processing. In the second displacement-amount computation processing, first, the distance L between the first linear-welded portion J1 and the islandlike-welded portion J2*b* is computed based on the binarized image. This computation of the distance L can be performed as follows: for example, obtaining a subtracted value ΔY (=YJ2*b*−YJ1*a*) by subtracting the average value YJ1*a* of the Y coordinate values of a plurality of pixels constituting the first linear-welded portion J1 from the average value YJ2*ba* of the Y coordinate values of a plurality of pixels constituting the islandlike-welded portion J2*b*, and converting the subtracted value ΔY to the actual distance L. For example, in order to convert the subtracted value ΔY to the actual distance, correspondence data between the subtracted values ΔY and the actual-size converted values (values of the actual distance L) in the transport direction is stored in the memory. Therefore, the second image processing section 53*c* acquires from such corresponding data the value of the distance L corresponding to the subtracted value ΔY.

Note that the pixels corresponding to the first linear-welded portion J1 can be distinguished from the pixels corresponding to the islandlike-welded portion J2*b* in the following manner, for example: since the range of the Y coordinate in which pixels related to the first linear-welded portion J1 should be present is previously known, the pixels within this range are determined as the pixels related to the first linear-welded portion J1 and the other pixels are determined as pixels related to the islandlike-welded portion J2*b*.

Then, by subtracting the computed value of the distance L from a predetermined reference value Ls previously stored in the memory, a subtracted value ΔL (=Ls−L) is computed. The reference value Ls is a preset value which is obtained based on the design drawing of the cleaning web member 1, etc., as shown in FIG. 11, which is the target value of the distance between the target formation position PMJ1 for the first linear-welded portion J1 and the center position of the islandlike-welded portion J2*b*. Therefore, the subtracted value ΔL obtained by subtracting the value of the distance L from the reference value Ls indicates the displacement amount ΔTa between the actual formation position of the first linear-welded portion J1 and its target formation position PMJ1. Thus, the second image processing section 53*c* transmits the subtracted value ΔL to the second control section as information of the displacement amount ΔTa. Then, having received this information, the second control section controls the servo motor of the movement mechanism 53, to move the upper head 50a and the lower head 50b in a direction in which the displacement amount ΔTa decreases as described above.

The second displacement-amount computation processing described above is a mere example, and the invention is not limited to this. For example, in place of the computation of the value of the distance L between the first linear-welded portion J1 and the islandlike-welded portion J2b, the value of the distance between the first linear-welded portion J1 and the second linear-welded portion J2a may be computed, to obtain the displacement amount Ala between the actual formation position of the first linear-welded portion J1 and its target formation position PMJ1.

Other Embodiments

While the invention has been described in the form of a preferred embodiment, it is to be understood that the embodiment is presented only for easy understanding of the invention and should not be construed as limiting the invention. Also, various modifications and improvements can be made in the invention without departing from the spirit of the invention, and, naturally, the invention includes equivalents thereof. For example, the following variations can be made.

Although phototubes are used as an example of the detection sensors 47 and 57 of the intermittent transport devices in the upstream-side welding section S4 and the downstream-side welding section S5 in the above embodiment, the present invention is not limited to this. For example, the sensor 67 of the intermittent transport device 64 in the separation section S6 may be used, and, in conjunction with the use of the sensor 67, the control section 68 of the intermittent transport device 64 in the separation section S6 may be used. This can improve the accuracy of the transport suspension operation and the precision of the stop position in the intermittent transport, not only in the separation section S6, but also in the upstream-side welding section S4 and the downstream-side welding section S5. In other words, it is possible to improve the accuracy of the transport suspension operation and the precision of the stop position related to all the intermittent transport operations in the manufacturing line 10 for the cleaning web member 1, and, as a result, the cleaning web member 1 with high size precision can be manufactured.

Although the intermittent transport devices are used for the transport of the semi-finished product 1a in the upstream-side welding section S4 and the downstream-side welding section S5 in the above embodiment, the present invention is not limited to this. That is, the configuration may be made so that the first linear-welded portions J1, the second linear-welded portions J2a, and the islandlike-welded portions J2b can be formed while the semi-finished product 1a is being transported continuously with no intermittent suspension. As an example of such a configuration, provided is a heat-seal device similar to the heat-seal device 16 in the auxiliary-sheet production section S2 in FIG. 3. Such a heat-seal device has a pair of upper and lower seal rollers rotating in synchronization with the transport of the semi-finished product 1a. On the outer circumferential surface of the lower seal roller to be heated, there are protrusions having shapes corresponding to the first linear-welded portions J1 or the second linear-welded portions J2a and the islandlike-welded portions J2b; and the outer circumferential surface of the upper seal roller is smooth to receive the protrusions. Therefore, when the semi-finished product 1a passes through the nip between the pair of rollers, areas of the semi-finished product 1a coming into contact with the protrusions are selectively compressed in the thickness direction; at this stage, the areas are heated and melted. As a result, the first linear-welded portions J1, the second linear-welded portions J2a, and the islandlike-welded portions J2b are formed.

In the above embodiment, as an example of the planar image data, there is the grayscale data in which the color information of pixels includes only brightness. However, the invention is not limited thereto. For example, color image data in which the color information of pixels includes brightness, hue, and saturation may be employed. In that case, as the foregoing binarization processing, a color binarization processing can be performed.

The color binarization processing means a processing in which pixels having a specific color information are extracted from color image data of a planar image. In this case, the color information includes the values of the three factors: brightness; hue; and saturation, as described above. Therefore, with respect to each of brightness, hue, and saturation, the range of the color information of pixels to be extracted is defined as the binarization threshold (or the second binarization threshold) and is preset in the memory of the image processing section 67c (or the second image processing section 53c). The image processing section 67c (or the second image processing section 53c) can extract pixels having the preset color information, from the planar image.

For example, in the case of the image processing section 67c, if the foregoing three ranges of the binarization thresholds are preset based on a color specific to the imaged area AJ1 of the first linear-welded portion J1 within the planar image, the image processing section 67c refers to the color information of pixels within the planar image recorded in the planar image data. Then, the image processing section 67c allocates to a white pixel, a pixel that satisfies all three ranges of the binarization thresholds, and the image processing section 67c allocates a unsatisfying pixel to a black pixel, for example. This allocating operation is performed for every pixel of the planar image data; thereby, the imaged area AJ1 of the first linear-welded portion J1 within the planar image is extracted as the area of white pixels. According to this method, the imaged area AJ1 of the first linear-welded portion J1 is extracted from the planar image based on the color specific to the imaged area AJ1. This can increase the accuracy of extraction.

It is evident that the color binarization processing by the second image processing section 53c will be well described by replacing the terms "the first linear-welded portion J1" and "the binarization threshold" in the above description on the color binarization processing with "the first linear-welded portion J1 and the islandlike-welded portion J2b" and "the second binarization threshold," respectively. Therefore, description of this case is omitted.

In the above embodiment, the sensor 67 of the intermittent transport device 64 in the separation section S6 measures the displacement amount ΔT of the stop position of the first linear-welded portion J1 from the target stop position PM or the displacement amount ΔT of the stop position of the trough 2eev of the base sheet 2a from the target stop position PMv. That is, in the above embodiment, the first linear-welded portion J1 and the trough 2eev of the base sheet 2a are provided as examples of the "predetermined region" defined in the claims. However, the invention is not limited to this. For example, the "predetermined region" may be a weld portion such as the islandlike-welded portion J2b and the second linear-welded portion J2a, the mound 2eem of the base sheet 2a, or a region other than these portions.

Although the inspection windows W1, W1v, and W2 were used for the binarization processing in the above embodiment, the invention is not limited to this. That is, without use of such a inspection window, the entire area of the planar image related to the planar image data may be subjected to the binarization processing.

In the above embodiment, the cameras 67a and 53a of the sensors 67 and 53 are placed facing the bottom surface of the semi-finished product 1a, and the illumination members 67b and 53b thereof are placed facing the top surface thereof, that is, on the opposite side. However, this opposite arrangement may be employed. Specifically, the cameras 67a and 53a may be disposed facing the top surface of the semi-finished product 1a, and the illumination members 67b and 53b may be disposed facing the bottom surface thereof. Moreover, the imaging by the camera 67a or 53a is not limited to receiving of transmitted light from the semi-finished product 1a. That is, the camera 67a or 53a may perform imaging by receiving light relected from the semi-finished product 1a. In this case, it goes without saying that the illumination members 67b and 53b are placed on the same side as the cameras 67a and 53a with respect to the semi-finished product 1a and that the first binarization threshold and the second binarization threshold in the memories of the image processing sections 67c and 53c are respectively set to values corresponding to the reflected light.

LIST OF REFERENCE NUMERALS

1 Cleaning web member, 1a Semifinished product (multi-layer body, continuous web member), 1ae Downstream end portion, 1U Unit semi-finished product, 1BL Boundary position,
2 Base sheet, 2a Base sheet, 2e End portion,
2ee Edge, 2eem Mound, 2ees Crest, 2eev Trough,
3 Auxiliary sheet, 3a Auxiliary sheet, 3b Folded portion,
5 Fiber bundle, 5G Fiber bundle member, 5T Tow,
5a Fiber bundle,
7 Strip sheet, 7a Strip sheet,
9 Handle member, 9a Insertion portion,
10 Manufacturing line, 12 Reel device, 13 Reel device,
15 Folding-up device,
16 Heat-seal device, 16a Seal roller, 16b Seal roller,
17 Reel device
18 Cutter roller device, 18a Roller, 18b Roller,
30 Cutter roller device (Edge cutter device),
31a Upper roller, 31b Lower roller,
40 Ultrasonic welding device, 40a Upper head, 40b Lower head,
45 Transport roller, 47 Detection sensor, 48 Control section,
49 Dancer roller,
50 Ultrasonic welding device (Weld bonding device),
50a Upper head (welding head), 50b Lower head (welding head),
52 Movement mechanism,
53 Second sensor, 53a Camera (second imaging section), 53b Illumination member,
53c Second image processing section (second binarization section, second displacement-amount computation section),
55 Transport roller, 57 Detection sensor, 58 Control section,
59 Dancer roller,
60 Cutter mechanism, 60a Upper blade, 60b Lower blade,
64 Intermittent transport device, 65 Belt conveyor (intermittent transport mechanism),
65a Roller, 65b Roller, 65c Endless belt,
67 Sensor, 67a Camera (imaging section), 67b Illumination member,
67c Image processing section (binarization section, displacement-amount computation section),
68 Control section,
J1 First linear-welded portion (linear welded-bonded portion, first welded-bonded portion),
J2 Second welded-bonded portion, J2a Second linear-welded portion, J2b Islandlike-welded portion,
P3 Merging position, P5a Merging position, P5b Merging position,
P60 Cut position, P67 Measurement position,
PM Target stop position, PMv Target stop position, PMJ1 Target formation position,
S1 Base-sheet feeding section, S2 Auxiliary-sheet production section,
S3 Cutting section, S4 Upstream-side welding section,
S5 Downstream-side welding section, S6 Separation section,
W1 Inspection window, W1v Inspection window, W2 Inspection window,
A2a imaged area of base sheet, A2eev imaged area of trough,
AJ1 imaged area of first linear-welded portion (imaged area of welded-bonded portion),
AJ2a imaged area of second linear-welded portion, AJ2b imaged area of islandlike-welded portion,
ASP imaged area of space, CP Center position
SP3 Hollow (a pair of space portions)

The invention claimed is:

1. A manufacturing apparatus for manufacturing a cleaning web member by intermittently cutting a continuous web member at a product pitch in a transport direction,
the continuous web member having
a base sheet continuous in the transport direction and
a fiber bundle placed on and secured to the base sheet with a direction of fibers being along the transport direction,
said apparatus comprising:
an intermittent transport mechanism that intermittently transports the continuous web member in the transport direction;
a cutter mechanism
that is disposed downstream from the intermittent transport mechanism in the transport direction, and
that produces a downstream end portion of the continuous web member as the cleaning web member by cutting and separating the downstream end portion from the continuous web member while transport of the continuous web member is suspended;
a sensor
that measures a displacement amount of a stop position of a predetermined region of the continuous web member from a target stop position, while the transport of the continuous web member is suspended, the measurement being performed at a measurement position which is a position upstream from the intermittent transport mechanism in the transport direction,
that includes an imaging section that, while the transport of the continuous web member is suspended, (i) images one surface of the continuous web member at an imaging position which is the measurement position, the one surface including the predetermined region, and (ii) generates a data of a planar image of the one surface as a planar image data, and a displacement-amount computation section that computes the displacement amount based on a position of an area in which the predetermined region is imaged and which is within the planar image of the planar image data; and a control section that controls a transport amount related to the intermittent transport by the intermittent transport mechanism based on information of the displacement amount output from the displacement-amount computation section.

2. The manufacturing apparatus according to claim 1, further comprising:

a binarization section that, at a time of generating a binarized image based on the planar image data, performs a binarization processing so that an image defined by one of the two values of the binarized image includes an area in which the predetermined region is imaged and which is within the planar image, wherein the displacement-amount computation section computes the displacement amount based on the position of the area in which the predetermined region is imaged and which is within the binarized image.

3. The manufacturing apparatus according to claim 1, further comprising: a weld bonding device disposed upstream from the intermittent transport mechanism in the transport direction, wherein the weld bonding device integrally bonds a multilayer body together to obtain a welded-bonded portion in the multilayer body, and produces the continuous web member, the multilayer body has an auxiliary sheet, the base sheet, and the fiber bundle continuous in the transport direction, the welded-bonded portion extends straight in a width direction orthogonal to the transport direction, a target formation position of the welded-bonded portion in the transport direction is a position corresponding to a center position of the cleaning web member, the welded-bonded portion serves as a boundary partitioning a space between the auxiliary sheet and the base sheet into a pair of spaces which are adjacent to each other, the pair of spaces serve as spaces into which two insertion portions of a handle member of the cleaning web member are inserted to secure the handle member to the cleaning web member during use of the cleaning web member, and the predetermined region is the welded-bonded portion.

4. The manufacturing apparatus according to claim 3, wherein the intermittent transport mechanism intermittently transports the multilayer body through the weld bonding device, in the transport direction, the weld bonding device integrally bonds the multilayer body together and produces the continuous web member by sandwiching the multilayer body whose transport is suspended between a pair of welding heads of the weld bonding device in a thickness direction of the multilayer body, and forming the welded-bonded portion at a region where the multilayer body is sandwiched between the pair of welding heads, the weld bonding device includes a movement mechanism that moves the pair of welding heads in the transport direction for changing a position of the pair of welding heads in the transport direction, a second sensor that measures a second displacement amount of a formation position of the welded-bonded portion of the continuous web member from the target formation position, while the transport of the continuous web member is suspended, the measurement being performed at a second measurement position which is a position downstream from the pair of welding heads in the transport direction, the second sensor includes a second imaging section that, while transport of the continuous web member is suspended, (i) images the one surface of the continuous web member and (ii) generates a data of a planar image of the one surface as a planar image data, a second binarization section that, at a time of generating a binarized image based on the planar image data, performs a binarization processing so that an image defined by one of the two values of the binarized image includes an area in which the welded-bonded portion is imaged and which is within the planar image, a second displacement-amount computation section that computes the second displacement amount based on a position of the area in which the welded-bonded portion is imaged and which is within the binarized image, and a second control section that, by controlling the movement mechanism based on information on the second displacement amount output from the second displacement-amount computation section, changes the position of the pair of welding heads in the transport direction toward a direction in which the second displacement amount decreases.

5. The manufacturing apparatus according to claim 1, further comprising:

an edge cutter device disposed upstream from the intermittent transport mechanism in the transport direction, wherein the edge cutter device cuts edges of the base sheet in a width direction into a wave shape having mounds and troughs alternately, the width direction being orthogonal to the transport direction, the edge cutter device cuts the mounds so that each unit corresponding to the cleaning web member has one mound at each of the edges of the base sheet and so that the position of a crest of the mound corresponds to a center position of the cleaning web member, the cutter mechanism cuts the continuous web member at a position of each of the troughs which serves as a target cut position, and produces the cleaning web member in which cut regions serve as tips of a brush section, and the predetermined region is the trough of the edge of the base sheet.

6. A manufacturing method of manufacturing a cleaning web member by intermittently cutting a continuous web member at a product pitch in a transport direction, the continuous web member having a base sheet continuous in the transport direction and
a fiber bundle placed on and secured to the base sheet with a direction of fibers being along the transport direction,
said method comprising:
  transporting intermittently the continuous web member in the transport direction by an intermittent transport mechanism;
  producing a downstream end portion of the continuous web member as the cleaning web member by cutting and separating with a cutter mechanism the downstream end portion from the continuous web member while transport of the continuous web member is suspended, the cutter mechanism being disposed downstream from the intermittent transport mechanism in the transport direction;
  measuring a displacement amount of a stop position of a predetermined region of the continuous web member from a target stop position while the transport of the continuous web member is suspended, the measuring being performed at a measurement position which is a position upstream from the intermittent transport mechanism in the transport direction,
  wherein the measuring includes
    generating a data of a planar image of one surface of the continuous web as a planar image data by imaging at an imaging position the one surface of the continuous web member while the transport of the continuous web member is suspended, the one surface including the predetermined region and the imaging position being the measurement position;
    computing the displacement amount based on a position of an area in which the predetermined region is imaged and which is within the planar image; and
    changing a transport amount related to the intermittent transport by the intermittent transport mechanism based on information of the measured displacement amount.

* * * * *